United States Patent
Cozzo et al.

(10) Patent No.: US 11,902,910 B2
(45) Date of Patent: Feb. 13, 2024

(54) POWER CONTROL OF MULTIPLE UPLINK TRANSMISSIONS

(71) Applicant: Samsung Electronics Co., Ltd., Suwon-si (KR)

(72) Inventors: Carmela Cozzo, San Diego, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 17/447,186

(22) Filed: Sep. 8, 2021

(65) Prior Publication Data
US 2022/0086772 A1 Mar. 17, 2022

Related U.S. Application Data

(60) Provisional application No. 63/084,055, filed on Sep. 28, 2020, provisional application No. 63/078,026, filed on Sep. 14, 2020.

(51) Int. Cl.
*H04W 52/34* (2009.01)
*H04W 52/14* (2009.01)

(52) U.S. Cl.
CPC ....... *H04W 52/346* (2013.01); *H04W 52/146* (2013.01)

(58) Field of Classification Search
CPC ............. H04W 52/346; H04W 52/146; H04W 52/367; H04W 52/08; H04W 52/281
See application file for complete search history.

(56) References Cited

U.S. PATENT DOCUMENTS

| | | | |
|---|---|---|---|
| 2018/0054783 A1* | 2/2018 | Luo | H04B 17/318 |
| 2018/0310257 A1 | 10/2018 | Papasakellariou | |
| 2019/0253988 A1* | 8/2019 | Khoshnevisan | H04W 52/146 |
| 2020/0137695 A1* | 4/2020 | Papasakellariou | H04W 52/08 |

FOREIGN PATENT DOCUMENTS

KR  10-2019-0133284 A  12/2019

OTHER PUBLICATIONS

"3rd Generation Partnership Project; Technical Specification Group Radio Access Network; NR; Physical channels and modulation (Release 16)", 3GPP TS 38.211 V16.0.0, Dec. 2019, 129 pages.

(Continued)

*Primary Examiner* — John J Lee

(57) ABSTRACT

Methods and apparatuses for power control of multiple uplink transmissions. A method for operating a user equipment includes receiving information for first parameters and for second parameters, determining a first power for a first channel with a first spatial setting to a first reception point of a serving cell using the first parameters, and determining a second power for a second channel with a second spatial setting to a second reception point of the serving cell using the second parameters. The method further includes transmitting, to the first reception point of the serving cell, the first channel using the first power and the first spatial setting; and transmitting, to the second reception point of the serving cell, the second channel using the second power and the second spatial setting.

16 Claims, 23 Drawing Sheets

(56) References Cited

OTHER PUBLICATIONS

"3rd Generation Partnership Project; Technical Specification Group Radio Access Network; NR; Multiplexing and channel coding (Release 16)", 3GPP TS 38.212 V16.0.0, Dec. 2019, 145 pages.
"3rd Generation Partnership Project; Technical Specification Group Radio Access Network; NR; Physical layer procedures for control (Release 16)", 3GPP TS 38.213 V16.6.0, Jun. 2021, 187 pages.
"3rd Generation Partnership Project; Technical Specification Group Radio Access Network; NR; Physical layer procedures for data (Release 16)", 3GPP TS 38.214 V16.0.0, Dec. 2019, 147 pages.
"5G; NR; Medium Access Control (MAC) protocol specification (3GPP TS 38.321 version 15.8.0 Release 15)", ETSI TS 138 321 V15.8.0, Jan. 2020, 80 pages.
"5G; NR; Radio Resource Control (RRC); Protocol specification (3GPP TS 38.331 version 15.8.0 Release 15)", ETSI TS 138 331 V15.8.0, Jan. 2020, 527 pages.
International Search Report and Written Opinion dated Dec. 16, 2021, regarding International Application No. PCT/KR2021/012480 7 pages.
Intel Corporation, "Multi-TRP enhancements for inter-cell operation", 3GPP TSG RAN WG1 #102-e, R1-2005860, Aug. 2020, pages.

\* cited by examiner

POWER CONTROL OF MULTIPLE UPLINK TRANSMISSIONS

CROSS-REFERENCE TO RELATED APPLICATION AND CLAIM OF PRIORITY

This application claims priority under 35 U.S.C. § 119(e) to U.S. Provisional Patent Application No. 63/078,026 filed on Sep. 14, 2020, and U.S. Provisional Patent Application No. 63/084,055 filed on Sep. 28, 2020. The above-identified provisional patent applications are hereby incorporated by reference in their entirety.

TECHNICAL FIELD

The present disclosure relates generally to wireless communication systems and, more specifically, the present disclosure relates to power control of multiple uplink transmissions and prioritization of uplink transmissions.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to power control of multiple uplink transmissions and prioritization of uplink transmissions.

In one embodiment, a user equipment (UE) is provided. The UE includes a transceiver configured to receive information for first parameters and for second parameters, and a processor operably connected to the transceiver. The processor is configured to determine a first power for a first channel with a first spatial setting to a first reception point of a serving cell using the first parameters, and a second power for a second channel with a second spatial setting to a second reception point of the serving cell using the second parameters. The transceiver is further configured to transmit, to the first reception point of the serving cell, the first channel using the first power and the first spatial setting, and transmit, to the second reception point of the serving cell, the second channel using the second power and the second spatial setting.

In another embodiment, a base station (BS) is provided. The BS includes a transceiver configured to transmit information for first parameters and for second parameters, and a processor operably connected to the transceiver. The processor is configured to determine a first power for a first channel with a first spatial setting to a first reception point of a serving cell using the first parameters, and a second power for a second channel with a second spatial setting to a second reception point of the serving cell using the second parameters. The transceiver is further configured to receive the first channel using the first power and the first spatial setting at the first reception point of the serving cell, and the second channel using the second power and the second spatial setting at the second reception point of the serving cell.

In yet another embodiment, a method is provided. The method includes receiving information for first parameters and for second parameters, determining a first power for a first channel with a first spatial setting to a first reception point of a serving cell using the first parameters, and determining a second power for a second channel with a second spatial setting to a second reception point of the serving cell using the second parameters. The method further includes transmitting, to the first reception point of the serving cell, the first channel using the first power and the first spatial setting; and transmitting, to the second reception point of the serving cell, the second channel using the second power and the second spatial setting.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
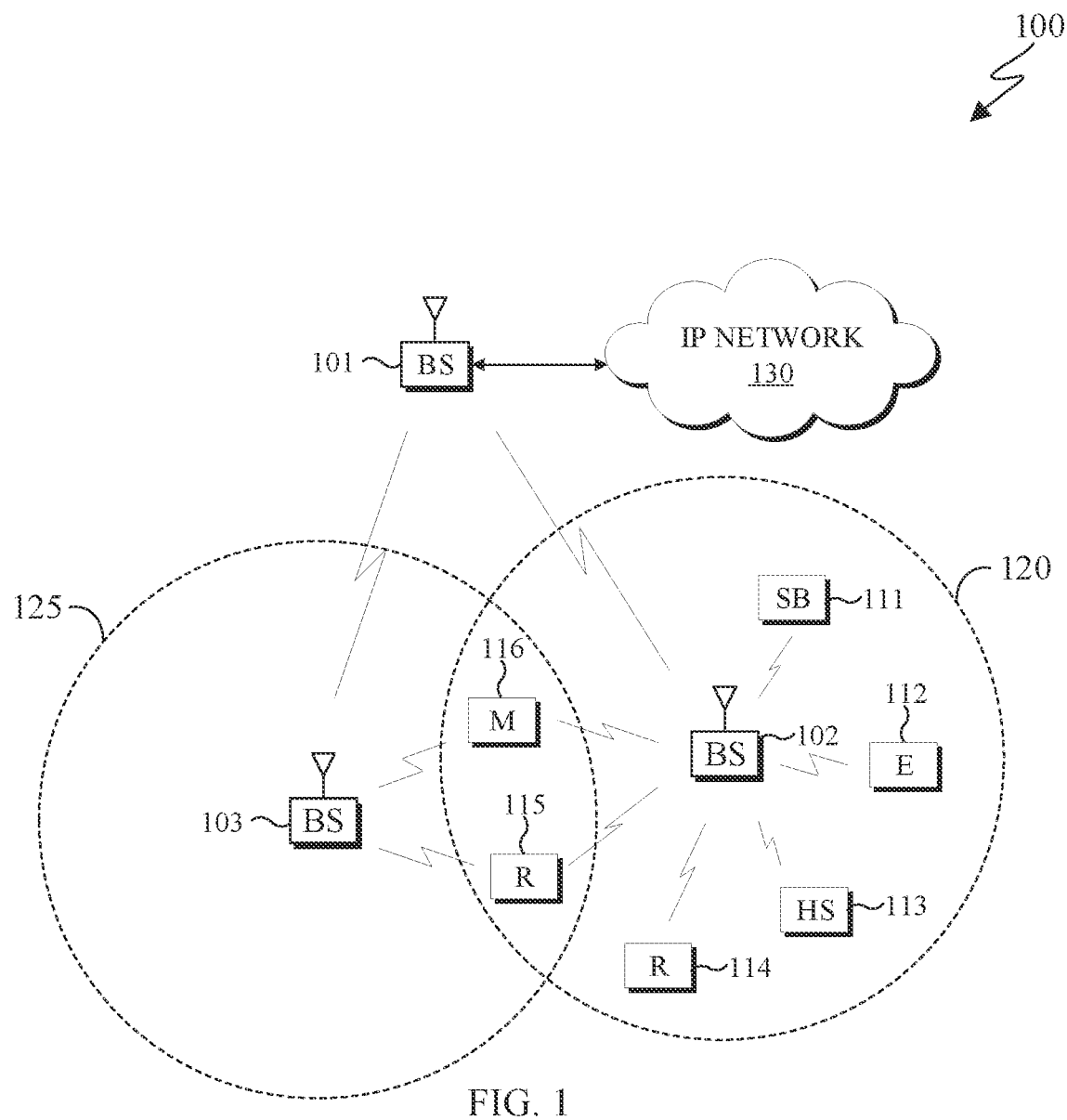
FIG. 1 illustrates an example wireless network according to embodiments of the present disclosure.

FIGS. 1 through 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: (i) 3GPP TS 38.211 v16.0.0, "NR; Physical channels and modulation;" (ii) 3GPP TS 38.212 v16.0.0, "NR; Multiplexing and channel coding," (iii) 3GPP TS 38.213 v16.6.0, "NR; Physical layer procedures for control," (iv) 3GPP TS 38.214 v16.0.0, "NR; Physical layer procedures for data," (v) 3GPP TS 38.321 v15.8.0, "NR; Medium Access Control (MAC) Protocol Specification," and (vi) 3GPP TS 38.331 v15.8.0, "NR; Radio Resource Control (RRC) Protocol Specification."

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
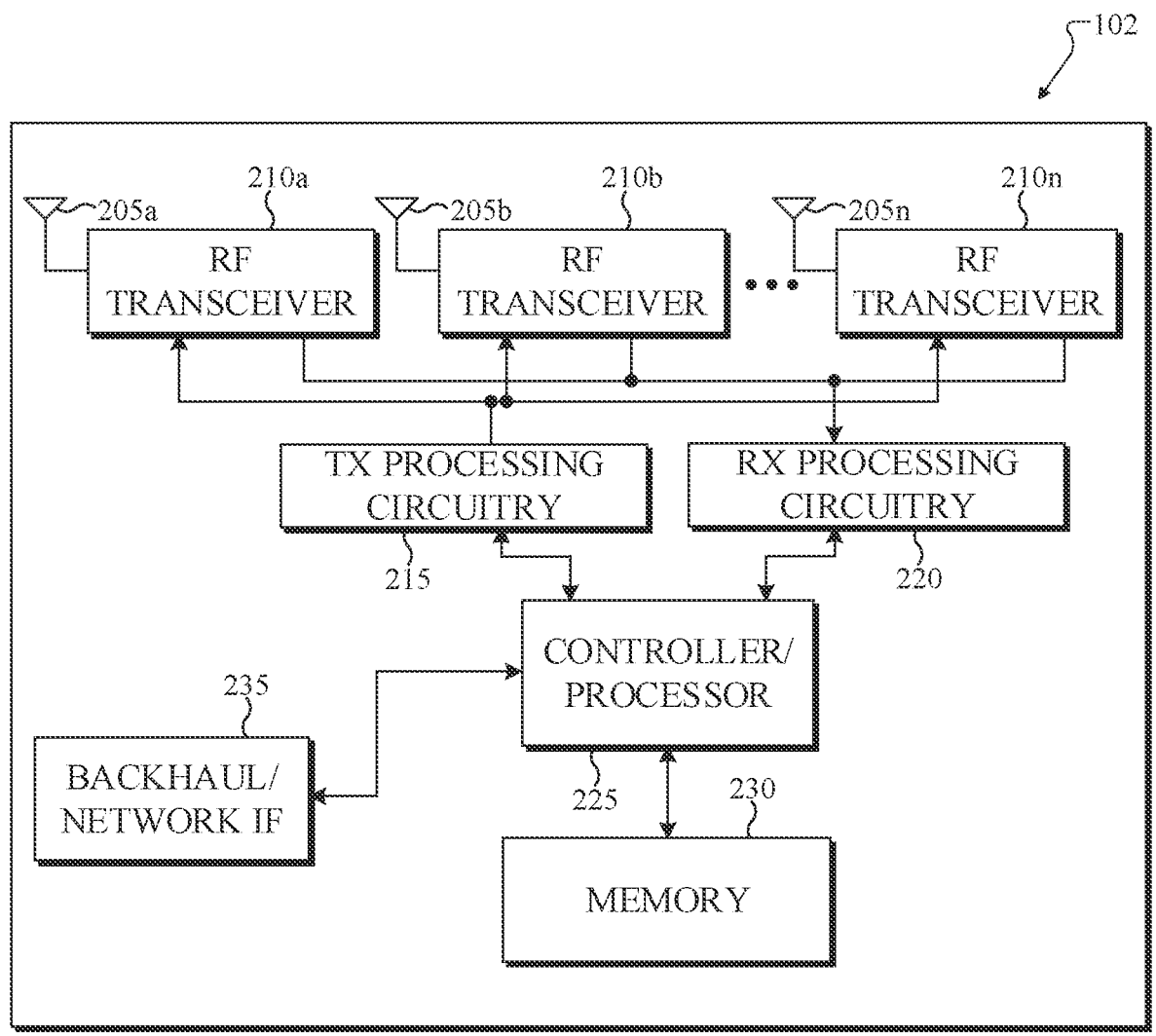
FIG. 2 illustrates an example base station (BS) according to embodiments of the present disclosure.
Figure 3:
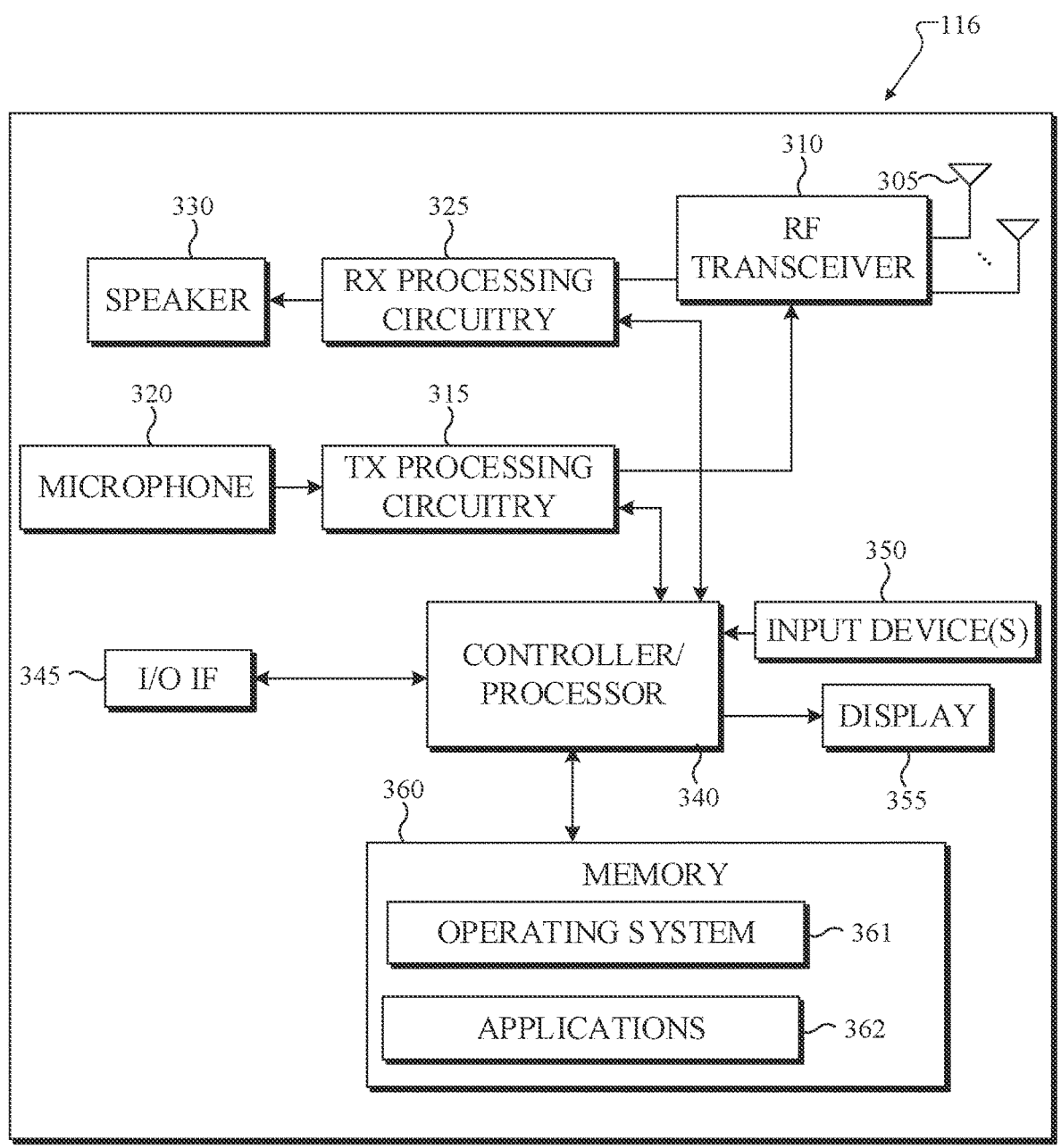
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for prioritization of uplink transmissions and power control of multiple uplink transmissions. In certain embodiments, and one or more of the BSs 101-103 includes circuitry, programing, or a combination thereof for prioritization of uplink transmissions and power control of multiple uplink transmissions.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210*a*-210*n*, the RX processing circuitry 220, and the TX processing circuitry 215 in accordance with well-known principles. The controller/processor 225 could support additional functions as well, such as more advanced wireless communication functions. For instance, the controller/processor 225 could support prioritization of uplink transmissions and power control of multiple uplink transmissions. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports prioritization of uplink transmissions and power control of multiple uplink transmissions. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes power control of multiple uplink transmissions and prioritization of uplink transmissions. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
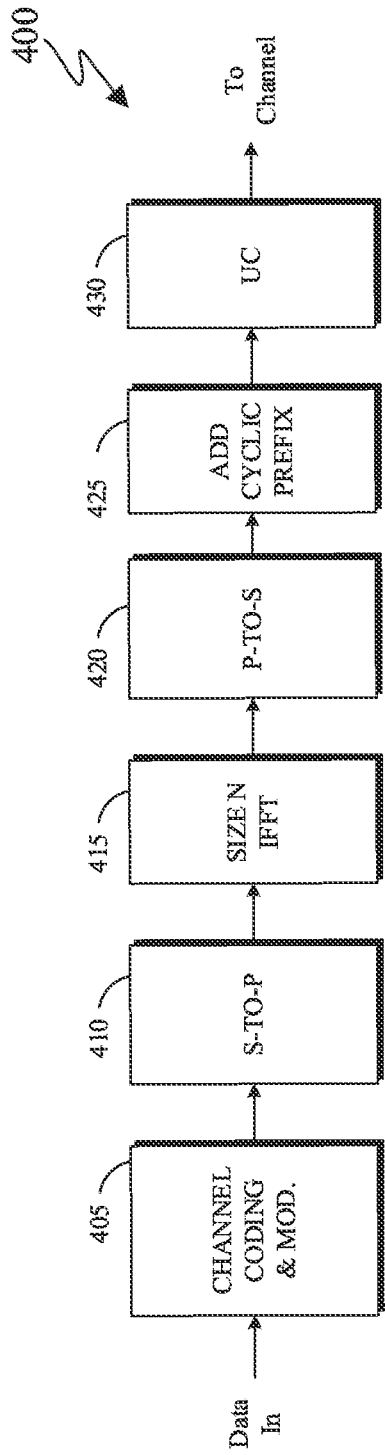
FIGS. 4 and 5 illustrate example wireless transmit and receive paths according to embodiments of present disclosure.
Figure 5:
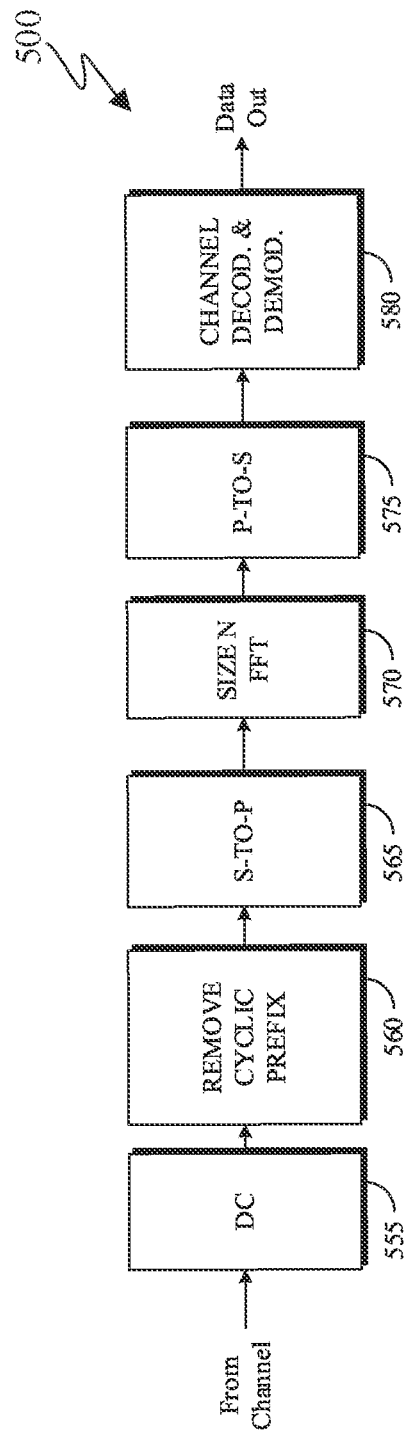

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support prioritization of uplink transmissions and power control of multiple uplink transmissions as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In certain embodiments, when a UE is configured for (i) operation in multiple cells, (ii) operation with carrier aggregation, or (iii) operation with multiple transmission/reception points (TRPs), the UE is provided or determines spatial settings for transmissions on multiple cells, multiple carriers of a same cell, or to multiple TRPs of a same cell or of different cells. For example, considering a case of two cells, or two carriers of a same cell, or two TRPs of a cell, a UE can be configured to transmit on cell 0 with spatial setting 0 and on cell 1 with spatial setting 1. Cell 0 and cell 1 can be a same cell and two transmissions with different spatial settings can correspond to different reception points for the cell.

Embodiments of the present disclosure take into consideration that a UE may not be able to transmit simultaneously using different spatial settings, and at any given time a UE can transmit using one spatial setting from a set of spatial settings. For example, a UE can be equipped with a single transmission antenna panel, or with two panels but only one panel is activated at any given time, and then the UE can transmit with only one spatial setting at a given time. A gNB can schedule PUSCH transmissions in a TDM manner with different spatial settings.

When a UE is configured to transmit a PUSCH with repetitions, using TDM for transmissions with different spatial settings can be inefficient in terms of resource allocation, latency, and performance. Non-scheduled/configured transmissions should also be considered. When CG (configured grant) PUSCH resources are configured to a UE by a gNB, the UE transmits CG-PUSCH with a periodicity and a number of repetitions configured by higher layers. For example, in a given slot there can be a PUSCH repetition having a first spatial setting colliding (being simultaneous) with a CG-PUSCH transmission having a second spatial setting.

When a UE is configured with carrier aggregation (CA) or dual connectivity (DC) operation, the UE can transmit simultaneously on multiple component carriers/cells. For example, in case of CA operation, there can be a PUSCH transmission using a first spatial setting on a first cell and a repetition of a PUSCH transmission using a second spatial setting on a second cell. For such cases, when a UE can transmit using only one spatial setting at a given time, rules for prioritization of a PUSCH transmission need to be defined. When a UE prioritizes a first PUSCH transmission with a first spatial setting, the UE is expected to cancel other transmissions with different spatial settings than the first spatial setting before the first symbol that overlaps with the prioritized PUSCH transmission with the first spatial setting. Alternatively, the UE can postpone a deprioritized transmission until a later transmission occasion. A transmission occasion can be a slot or a group of consecutive symbols of length l, l≥1.

Therefore, embodiments of the present disclosure take into consideration that there is a need to define rules for prioritization of a PUSCH transmission when a UE is configured for operation with multiple carriers/cells or for operation with transmission with multiple spatial settings.

Embodiments of the present disclosure also take into consideration that there is need to provide means for a UE to determine a priority of a PUSCH transmission.

Embodiments of the present disclosure further take into consideration that there is need to provide signaling mechanisms for a gNB to indicate to a UE a priority of a PUSCH transmission by the UE.

Accordingly, the present disclosure relates to defining prioritizations for transmissions from a UE for operation in multiple cells. The operations can include operation with CA. The operations can include operations with multiple TRPs (wherein a TRP is defined by a spatial setting for a reception by the UE (transmission point)). The operations can include operations for a transmission by the UE (reception point). The present disclosure also relates to determining a priority for overlapping PUSCH and PUCCH transmissions from a UE based on configurations by a serving gNB and/or on parameters estimated by the UE.

This disclosure relates to determining prioritizations for power reductions for PUSCH and PUCCH transmissions with different spatial settings on different cells or carriers. The disclosure also relates to configuring and indicating transmission prioritizations for a UE. The disclosure also relates to determining a power of PUSCH transmission with a spatial setting. The disclosure additionally relates to determining a power of a PUCCH transmission with a spatial setting. The disclosure further relates to determining prioritizations for transmissions with repetitions for a UE.

Additionally, this disclosure further relates to determining a priority for overlapping PUSCH and PUCCH transmissions from a UE when the transmissions are with repetitions. Additionally, the present disclosure relates to determining a priority for PUSCH or PUCCH transmissions by a UE based on a configuration or indication by a serving gNB. The present disclosure also relates to defining rules for a UE to cancel or postpone transmissions of smaller priority. The present disclosure further relates to determining by a UE whether to cancel or postpone transmissions with smaller priority based on configuration or indication by a serving gNB.

It is noted that a UE may not be able to transmit simultaneously using different spatial settings, and at any given time a UE can transmit using one spatial setting from a set of spatial settings. A UE can be equipped with a single transmission antenna panel, or with two panels but only one panel is activated at any given time, and then the UE can transmit with only one spatial setting at a given time. A gNB can schedule PUSCH transmissions in a TDM manner with different spatial settings.

In the following embodiments, a UE (such as the UE 116) that is configured with PUSCH repetition type A refers to the transmission of a single repetition in a slot, wherein all symbols of a repetition are transmitted within a slot duration, repetitions are over a same number of symbols, and repetition in a slot can be skipped when corresponding symbols include symbols that are unavailable for transmission by the UE, such as reserved symbols or symbol with downlink transmission direction. A UE configured with PUSCH repetition type B includes cases when the UE can transmit more than one repetitions in a slot, a repetition can span more than one slot, and different repetitions can be over different numbers of symbols. A downlink control information (DCI) format scheduling the PUSCH transmission with repetition type B can indicate a number of symbols for an initial/first repetition. If the UE is not configured with PUSCH repetitions, the UE transmits only a first (initial) repetition.

In certain embodiments, prioritization is based on PUCCH configurations. For example, When PUSCH transmissions from a UE are configured on cell 0 and on cell 1, and different spatial settings are used for transmission on cell 0 and on cell 1, and the UE can transmit at a given time using only one spatial setting, the UE prioritizes a transmission on the cell where the UE is configured to transmit PUCCH regardless of whether or not PUSCH transmissions are configured with repetitions, or PUSCH transmissions are scheduled by a DCI format (DG-PUSCH) or are configured by higher layers (CG-PUSCH). If the UE is not configured for PUCCH transmission on any of the cells or carriers where the UE transmits the PUSCHs, or if the UE is configured PUCCH transmission on both cells or carriers, the UE considers for prioritization of a transmission whether a PUSCH transmission is configured with repetitions. For instance, the UE can prioritize a transmission configured with a smaller number of repetitions (including no repetitions). Such prioritization can be applicable regardless of other conditions. A PUSCH repetition that includes an aperiodic CSI report can be prioritized for transmission over another PUSCH transmission or over a PUCCH transmission that is with or without repetitions.

For another example, when a UE is configured with PUCCH transmission on a cell or carrier, a PUSCH transmission can be prioritized on the cell or carrier at least when the UE would also transmit PUCCH in a same slot and the UCI is either multiplexed in the PUSCH transmission or the UE transmits simultaneously the PUSCH and the PUCCH on the cell or carrier.

For yet another example, when the UE is configured with PUCCH transmission on both cells or carriers, the UE can prioritize a PUSCH transmission on a cell or carrier. Here, the PUCCH transmission (i) includes HARQ-ACK information, (ii) has a larger number of symbols, (iii) is not configured with repetitions, (iv) is configured with a smaller number of repetitions, or (v) includes a first PUCCH repetition.

Figure 6:
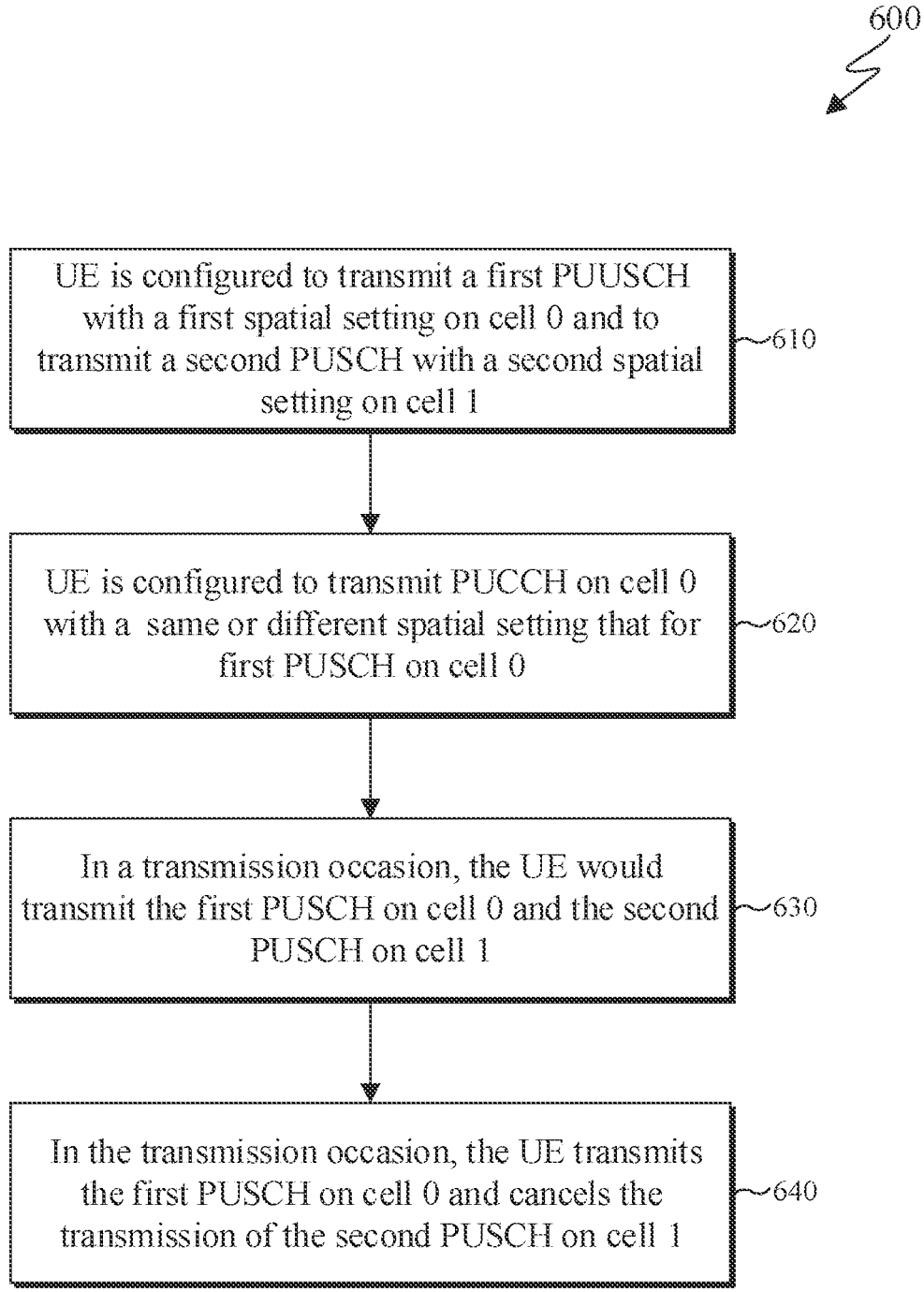
FIG. 6 illustrates an example method of a UE transmitting a first physical uplink shared channel (PUSCH) on cell 0 and a second PUSCH on cell 1 in a given transmission occurrence according to embodiments of present disclosure.

FIG. 6 illustrates an example method 600 of a UE transmitting a first physical uplink shared channel (PUSCH) on cell 0 and a second PUSCH on cell 1 in a given transmission occurrence according to embodiments of present disclosure. For example, the steps of the method 600 can be performed by any of the UEs 111-116 of FIG. 1, such as the UE 116 of FIG. 3. The method 600 of FIG. 6 is for illustration only and other embodiments can be used without departing from the scope of the present disclosure.

In step 610, a UE (such as the UE 116) is configured to transmit a first PUSCH with a first spatial setting on cell 0 and to transmit a second PUSCH with a second spatial setting on cell 1. In step 620, the UE is configured to transmit PUCCH on cell 0. In a transmission occasion, the UE would transmit the first PUSCH on cell 0 and the second PUSCH on cell 1 (step 630). In the transmission occasion, the UE transmits the first PUSCH on cell 0 and cancels the transmission of the second PUSCH on cell 1 (step 440).

Although FIG. 6 illustrates the method 600 various changes may be made to FIG. 6. For example, while the method 600 of FIG. 6 is shown as a series of steps, various steps could overlap, occur in parallel, occur in a different order, or occur multiple times. In another example, steps may be omitted or replaced by other steps. For example, steps of the method 600 can be executed in a different order.

In certain embodiments, prioritization is based on dynamic or configured grant transmission. For example, when a UE would transmit a PUSCH that is scheduled by an UL grant (DG-PUSCH) with a first spatial setting and a CG-PUSCH with a second spatial setting, that is different that the first spatial setting, the DG-PUSCH and the CG-PUSCH transmissions would overlap in time, and the UE is not capable of simultaneous transmissions with different spatial settings, the UE transmits the DG-PUSCH and cancels the CG-PUSCH transmission.

In certain embodiments, prioritization is based on path loss estimates. For example, when a UE would transmit a first PUSCH with a first spatial setting on cell 0 and a second PUSCH with a second spatial setting on cell 1, and the UE estimates a path loss (PL) for the first PUSCH transmission on cell 0 that is smaller than an estimated PL for the second PUSCH transmission on cell 1, the UE transmits the first PUSCH on cell 0 and does not transmit the second PUSCH. The UE measures a PL based on reception of one or more reference signals (for example PUSCH-PathlossReferenceRS or enableDefaultBeamPlForPUSCH), or the UE calculates the PL using a RS resource from a synchronization signals/primary broadcast channel (SS/PBCH) block with same SS/PBCH block index as the one the UE uses to obtain a master information block (MIB).

In this example, a UE would transmit (i) a first PUSCH with a first spatial setting on cell 0, (ii) a second PUSCH with a second spatial setting on cell 1, wherein the first and second PUSCH transmissions would overlap in time, (iii) the UE is configured to transmit a first PUCCH with a third spatial setting, that can be same as or different than the first spatial setting, on cell 0, (iv) transmit a second PUCCH with a fourth spatial setting, that can be same as or different than the second spatial setting, on cell 1, and (v) the estimated PL on cell 0 is smaller than the estimated PL on cell 1 then the UE transmits the first PUSCH on cell 0.

The determination of the PUSCH for the UE to transmit can also consider the contents of the PUCCH transmission. For example, the UE transmits the second PUSCH on cell 1 if the second PUCCH includes HARQ-ACK information and the first PUCCH does not include HARQ-ACK information. It is also possible that the UE determines a PUSCH to transmit based on a determination for a PUCCH to transmit where for example the UE transmits the first PUCCH on cell 0 and the second PUSCH on cell 1. The determination of the PUCCH for the UE to transmit can consider the estimated PL on cell 0 and cell 1.

The UE receives a set of reference signals to use for PUCCH PL estimation (for example PUCCH-PathlossReferenceRS or enableDefaultBeamPlForPUCCH), or the UE calculates the PL using a RS resource from an SS/PBCH block with same SS/PBCH block index as the one the UE uses to obtain MIB.

In certain embodiments, a UE transmits the first PUSCH on cell 0 when a UE would transmit (i) a first PUSCH with a first spatial setting on a cell 0, (ii) a second PUSCH with a second spatial setting on cell 1, wherein the first and second PUSCH transmissions would overlap in time, (iii) the UE is configured to transmit a first PUCCH with a third spatial setting, that is same or different than the first spatial setting, on cell 0, (iv) transmit a second PUCCH with a fourth spatial setting, that is same or different than the second spatial setting, on cell 1, and (v) the estimated PL on cell 0 corresponding to first spatial setting is smaller than the estimated PL on cell 1 corresponding to the second spatial setting.

The determination of a PUSCH for a UE to transmit can also consider that, when the UE is configured to transmit a first PUCCH with a third spatial setting, that is different than the first spatial setting, on cell 0, and transmit a second PUCCH with a fourth spatial setting, that is different than the second spatial setting, on cell 1, and the estimated PL on cell 0 corresponding to third spatial setting is smaller than the estimated PL on cell 1 corresponding to the fourth spatial setting, the UE transmits the first PUSCH with a first spatial setting and the first PUCCH with a third spatial setting on cell 0. The UE can measure the PL corresponding to a spatial setting based on the reception of a reference signal transmitted with a corresponding DL spatial setting, for example a PUSCH-PathlossReferenceRS or enableDefaultBeamPlForPUSCH from the channel used to send an UL grant for PUSCH transmission or a PUCCH-PathlossReferenceRS or enableDefaultBeamPlForPUCCH from the channel used to schedule the PUCCH transmission.

In certain embodiments, prioritization is based on a required transmit power. This embodiment is described in the below examples For example, when a UE (such as the UE 116) would transmit a first PUSCH with a first spatial setting on cell 0 and a second with a second spatial setting on cell 1, and the required transmit power for the first PUSCH transmission on cell 0 is lower than the required power for the second PUSCH transmission on cell 1, the UE transmits the first PUSCH on cell 0 and cancels the transmission of the second PUSCH.

For another example, when a UE (such as the UE 116) would transmit a first PUSCH with a first spatial setting on cell 0 and a second PUSCH with a second spatial setting on cell 1, and the UE is configured to transmit PUCCH on both cell 0 and cell 1 with same or different spatial settings as for the first and second PUSCH transmissions, and the required PUCCH transmission power on cell 0 is lower than the required PUCCH transmission power on cell 1, a UE prioritizes the first PUSCH transmission on cell 0.

In certain embodiments, prioritization is based on CORESETPoolIndex value. This embodiment is described in the below examples For example, when a UE (such as the UE 116) would transmit a first PUSCH with a first spatial setting that is scheduled by a PDCCH reception in a control resource set (CORESET) on a primary cell having an index provided by CORESETPoolIndex that is equal to 0 and a second PUSCH with a second spatial setting on cell 1, the UE transmits the first PUSCH on cell 0 and does not transmit the second PUSCH.

In certain embodiments, prioritization occurs for CA/DC operations. This embodiment is described in the below examples For example, for a UE configured with CA operation, when the UE would transmit a first PUSCH with a first spatial setting on a primary cell, and the UE would transmit a second PUSCH with a second spatial setting on a SCell, the UE transmits the first PUSCH on the primary cell and does not transmit the second PUSCH on the SCell.

For another example, for a DC operation when a UE would transmit a first PUSCH with a first spatial setting on a cell of the MCG (Master Cell Group), and a second PUSCH with a second spatial setting on a cell of the SCG (Secondary Cell Group), the UE transmits the first PUSCH on the cell of the MCG.

A prioritization of transmission on a cell of the MCG over a transmission on a cell of the SCG can also depend on the information content of each transmission. For example, the UE can prioritize transmission of a PUCCH on the SCG over a transmission of a PUSCH without uplink control information (UCI) on the MCG while the UE can prioritize transmission of a PUSCH with UCI on the MCG over transmission of a PUCCH on the SCG. For example, the UE can prioritize transmission of a physical random access channel (PRACH) on the SCG, such as on the primary cell of the SCG, over a PUSCH or PUCCH transmission on the MCG. A similar prioritization can apply for operation with CA where the UE can prioritize a first PUSCH transmission with UCI and a first spatial setting on a first cell over a second PUSCH transmission without UCI and a second spatial setting on a second cell.

In certain embodiments, prioritization is based on time pattern for PUSCH transmissions. This embodiment is described in the below examples and FIG. 7.

For example, when a UE is configured to transmit a first PUSCH with a first spatial setting on cell 0 or on a MCG and a second PUSCH with a second spatial setting on cell 1 or on a SCG, a gNB can provide by higher layers the UE a time pattern for transmission to either cell 0 or cell 1. The time pattern can be defined through a bitmap wherein each bit in the bitmap corresponds to a time unit such as a slot. The time unit can be defined relative to a slot for a reference subcarrier spacing (SCS), such as the SCS of the primary cell of the MCG, or can be in absolute time such as 0.5 ms or 1 ms. In a first time interval, the UE prioritizes transmission to cell 0 if a corresponding bit in the bitmap is '0' or prioritizes transmission to cell 1 if a corresponding bit in the bitmap is '1'. A time pattern can be periodic with a periodicity, in number of time units, that is either configured by a gNB or implicitly determined based on a size of bitmap of the time pattern. For example, the time pattern can be beneficial for interference coordination where transmission to cell 0 can be indicated during slots with low interference on cell 0 and transmission to cell 0 can be indicated during slots with low interference on cell 1. For example, the time pattern can be beneficial for improving reliability of transmissions on the SCG in certain slots because scheduling is independent on the MCG and the SCG and it can be beneficial to avoid a default prioritization for transmissions on the MCG and instead enable a network to control such prioritization using a corresponding time pattern where transmissions on the SCG can be prioritized.

For another example, a time pattern can allow different prioritizations in different time intervals. For example, a master node (MN) of an MCG can determine a time pattern where the MCG would configure transmissions from the UE in some time units and not configure transmissions from the UE in other time units of the time pattern. For example, the time pattern can be based on transmissions from the UE that are configured by higher layers and have predetermined transmission occasions or be a superset of such transmission occasions in order to allow additional dynamic scheduling of UE transmissions on the MCG. In other transmission occasions, the MCG can accept prioritization of transmissions to the SCG if the UE happens to have simultaneous transmissions on both the MCG and the SCG. Therefore, the MCG can provide a time pattern to the UE, and additionally inform the time pattern to the SCG, possibly in negotiation with the SCG, wherein the time pattern is represented by a bitmap, a bit of the bitmap corresponds to a time unit such as a slot on the primary cell of the MCG, or a slot according to a smallest sub-carrier spacing (SCS) configuration used in the DC operation for the UE, or an actual time unit such as a millisecond, a bit value of '0' indicates prioritization of transmission on the MCG during the time unit, and a bit value of '1' indicates prioritization of transmission on the SCG during the time unit.

Figure 7:
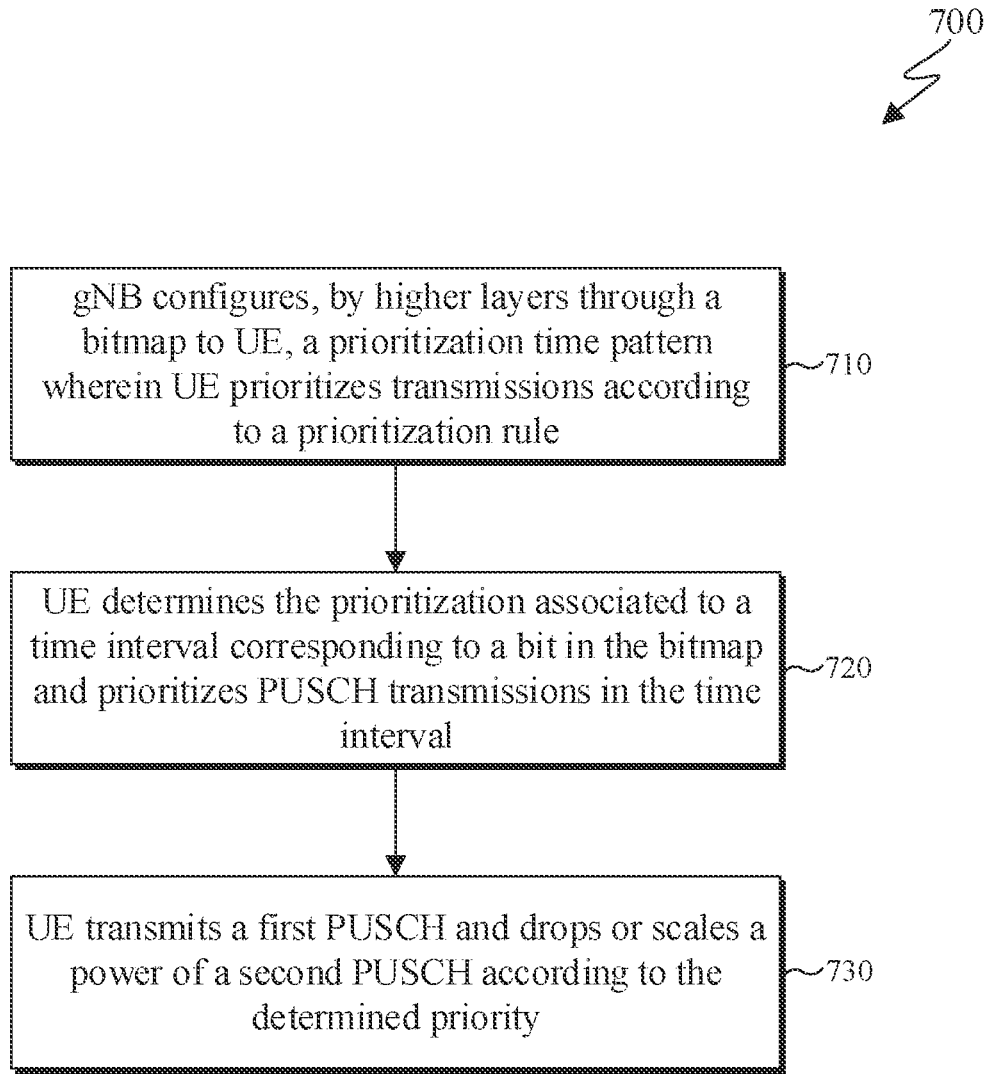
FIG. 7 illustrates an example method for a UE to determine a prioritization of transmissions on a master cell group (MCG) and a secondary cell group (SCG) according to a time pattern according to embodiments of present disclosure.

FIG. 7 illustrates an example method 700 for a UE to determine a prioritization of transmissions on a master cell group (MCG) and a secondary cell group (SCG) according to a time pattern according to embodiments of present disclosure. The steps of the method 700 can be performed by any of the UEs 111-116 of FIG. 1, such as the UE 116 of FIG. 3 and/or by a base station such as BS 102. The method 700 of FIG. 7 is for illustration only and other embodiments can be used without departing from the scope of the present disclosure.

In step 710, a gNB configures by higher layers through a bitmap a prioritization time pattern to a UE wherein the UE prioritizes transmissions, such as PUSCH transmissions, according to a prioritization rule. In step 720, the UE determines the prioritization associated to a time interval corresponding to a bit in the bitmap and prioritizes PUSCH transmissions in the time interval. In step 730, the UE transmits a channel/signal, such as a PUSCH, and drops or scales a power of a second PUSCH according to the determined priority. It is noted that the UE can drop or reduce power of a deprioritized transmission.

Although FIG. 7 illustrates the method 700 various changes may be made to FIG. 7. For example, while the method 700 of FIG. 7 is shown as a series of steps, various steps could overlap, occur in parallel, occur in a different order, or occur multiple times. In another example, steps may be omitted or replaced by other steps. For example, steps of the method 700 can be executed in a different order.

In certain embodiments, an indication of priority is in DCI. This embodiment is described in the below examples and FIG. 8.

For example, a gNB can send an indication to allow prioritization of a PUSCH transmission during a time interval where a configured time pattern would have deprioritized such transmission. For instance, when a UE is configured to transmit a first PUSCH with a first spatial setting on cell 0 and a second PUSCH with a second spatial setting on cell 1, during a time period when transmission on cell 1 is not prioritized according a prioritization rule, a serving gNB can indicate a transmission priority in a DCI format scheduling a PUSCH transmission. The indication of priority can affect only the PUSCH transmission scheduled by the same DCI format providing the priority indication, or can affect also subsequent transmissions, and this can depend on the type of prioritization that is changed by the DCI format indication. For instance, if transmission on cell 0 is deprioritized respect to transmission on cell 1 in a time interval based on a configured time pattern, then a DCI format indication can be used to alter the configured time pattern and prioritize transmissions on cell 0 for a single PUSCH transmission scheduled by a DCI format providing the prioritization indication, or for the scheduled PUSCH transmission scheduled by a DCI format providing the prioritization indication and subsequent PUSCH transmissions until a next change of priority according to the configured time pattern, or for all subsequent PUSCH transmissions until another indication by a DCI format is received. In another example when a UE determines whether to transmit PUSCH on cell 0 or on cell 1 based on the PL measured in cell 0 and cell 1, an indication can change the transmission prioritization to transmit, for example, based on a determination for a PUCCH transmission.

It is also possible that a PUSCH transmission is prioritized based on an indication of prioritization for a PUCCH. A serving gNB can indicate a priority for a PUCCH transmission in a DCI format that schedules the PUCCH transmission. For example, when a PUSCH transmission is prioritized on a cell or carrier where a PL is smaller and a PUCCH is configured on both cells and is configured to be transmitted in a same cell as the PUSCH transmission, and the PUCCH transmission includes HARQ-ACK information, a serving gNB can indicate a priority in a DCI format scheduling the PUCCH so that the UE prioritizes the PUCCH transmission and the PUSCH on the same cell is prioritized. A gNB can configure a priority indication in one or more DCI formats. A UE is not expected to receive more than one priority indication in more than one DCI formats in a slot.

For an indication of transmission priority, a 1-bit field of a DCI format can be used wherein a bit value of '1' indicates prioritization of the scheduled PUSCH transmission with a first spatial setting on cell 0, including repetitions if the PUSCH transmission is configured with repetitions. Alternatively, a bit value of '1' indicates prioritization of PUSCH transmissions with a first spatial setting on cell 0 for the time interval with a same priority of a time pattern where the priority indication is received. The time pattern can also include time periods without an indicated prioritization in which case the prioritization can be based on an indication by the DCI format scheduling a transmission or, for configured transmissions, the prioritization can be based on a cell index, or on a required path-loss, or on an information content, and so on.

It is also possible that the field indicates prioritization of PUSCH transmissions with a first spatial setting on cell 0 starting from a time the UE receives a PDCCH providing the DCI format with the priority indication field and the indication by the DCI format overrides the transmission priority determined according to a time pattern configured by higher layers. The time period where the indicated priority remains valid can be configured.

Additionally, it is also possible that an indication of priority by a DCI format can change the transmission priority only for certain prioritization rules according to a configuration by higher layers. For example, a UE is not expected to receive a priority indication by a DCI format when a UE prioritizes PUSCH transmission on cell 0 with a first spatial setting according to a prioritization rule that PUCCH is also configured for transmission on cell 0 with same spatial setting. Further, it is also possible that a priority indication is provided by a DCI format not scheduling a PUSCH transmission such as for example by a DCI format scheduling a PDSCH reception or a by DCI format in a PDCCH reception according to a common search space that can reset some or all bits of the bitmap that was previously configured by higher layers.

Figure 8:
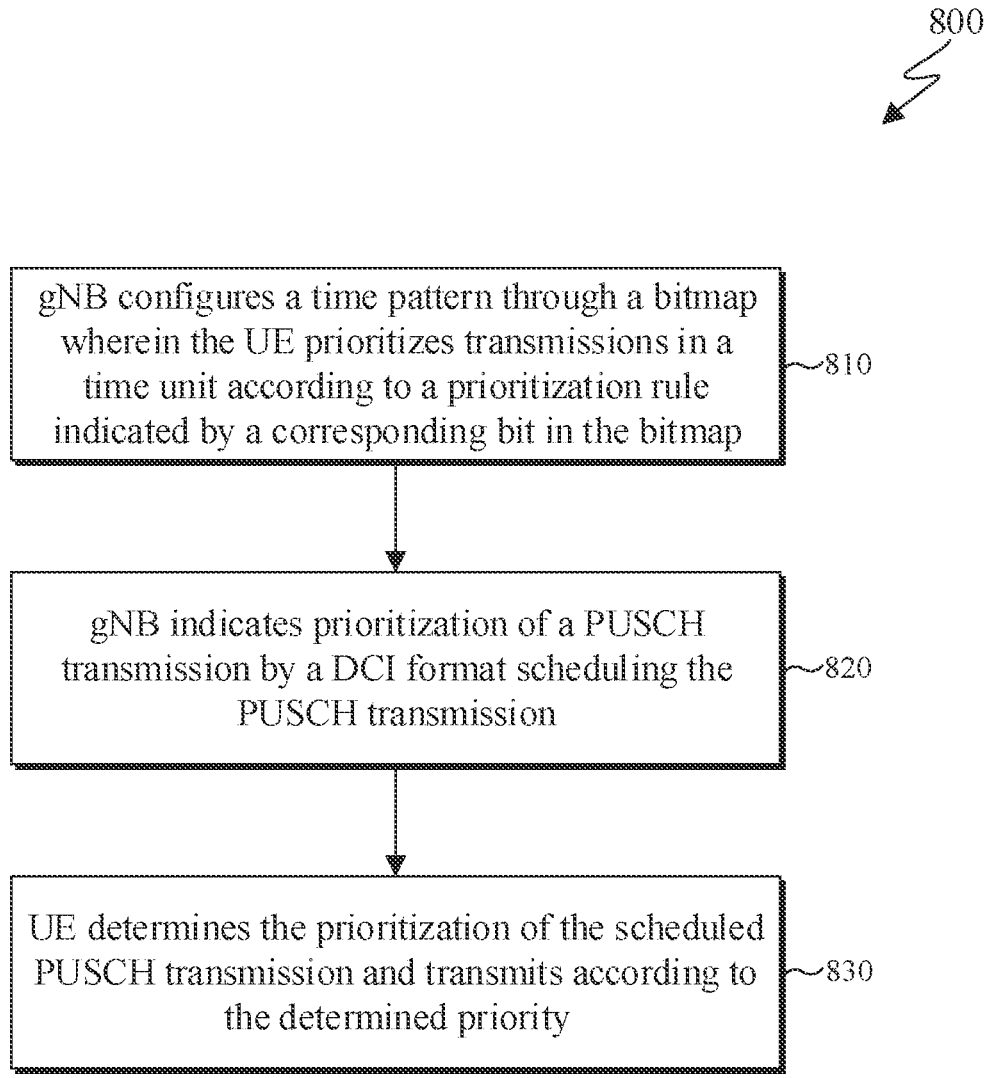
FIG. 8 illustrates an example method for a UE to determine a prioritization of transmissions according to an indication by a gNB according to embodiments of present disclosure.

FIG. 8 illustrates an example method 800 for a UE to determine a prioritization of transmissions according to an indication by a gNB according to embodiments of present disclosure. The steps of the method 800 can be performed by any of the UEs 111-116 of FIG. 1, such as the UE 116 of FIG. 3 and/or by a base station such as BS 102. The method 800 of FIG. 8 is for illustration only and other embodiments can be used without departing from the scope of the present disclosure.

In step 810, a gNB configures a time pattern through a bitmap wherein each bit of the bit-map corresponds to a time unit, such as a slot or a predetermined time duration such as a millisecond, of the time pattern and a UE prioritizes transmissions in a time unit according to a prioritization rule based on the indication by a corresponding bit in the bitmap. It is also possible that for some time units an indication by a bitmap is not provided.

In step 820, the gNB indicates prioritization of a PUSCH transmission in a time unit by a DCI format scheduling the PUSCH transmission. In step 830, the UE determines the prioritization of the scheduled PUSCH transmission and transmits according to the determined priority. The UE can apply the prioritization rules of the bitmap to configured-grant PUSCH transmissions.

Although FIG. 8 illustrates the method 800 various changes may be made to FIG. 8. For example, while the method 800 of FIG. 8 is shown as a series of steps, various steps could overlap, occur in parallel, occur in a different order, or occur multiple times. In another example, steps may be omitted or replaced by other steps. For example, steps of the method 800 can be executed in a different order.

In certain embodiments, prioritization is based on transmission of PUSCH repetitions. This embodiment is described in the below examples.

For example, when a UE (such as the UE 116) is configured to transmit a PUSCH with repetitions, and the UE would transmit a first PUSCH with a first spatial setting on cell 0 and a second PUSCH with a second spatial setting on cell 1, prioritization for a repetition of a PUSCH transmission in case of time overlapping can consider whether the repetition is a type A or a type B one, a number of repetitions for each PUSCH transmission, a position of a first symbol for a repetition, a number of symbols per repetition, or a sub-carrier spacing configuration for each PUSCH repetition.

For another example, when a UE would transmit (i) a first PUSCH with a first number of repetitions and a first spatial setting and (ii) a second PUSCH with a second number of repetitions and a second spatial setting, on a transmission occasion where a repetition of the first PUSCH transmission overlaps with a repetition of the second PUSCH transmission, the UE can prioritize various parameters. For example, the UE can prioritize a repetition of an initial transmission for a transport block (TB), wherein the repetition is either a first nominal repetition for type A repetitions or a first actual repetition for type B repetitions. For another example, the UE can prioritize a repetition for a transmission having a smaller repetition number. For another example, the UE can prioritize the repetition with a smaller (or a larger) number of symbols. For yet another example, the UE can prioritize the repetition with the smaller (or larger) value for a SCS configuration.

A UE can also prioritize a repetition of a PUSCH transmission, among overlapping PUSCH transmissions with repetitions, based on whether it is a first repetition or based on the repetition number. For instance, the UE can prioritize a first repetition of a first PUSCH transmission over subsequent repetitions of a second PUSCH transmission. If a repetition i of a first PUSCH transmission overlaps with repetition j of a second PUSCH transmission, with j>i, the UE transmits repetition i of the first PUSCH transmission and does not transmit repetition j of the second PUSCH transmission.

In certain embodiments, prioritization is based on a number of PUSCH symbols. This embodiment is described in the below examples and FIG. 9.

For example, a UE (such as the UE 116) can determine a prioritization for overlapping PUSCH transmissions based on a number of symbols in a slot for each of the overlapping PUSCH transmissions. For example, referring to the example in FIG. 8 in slot 1, the UE can prioritize PUSCH0 since in slot 1 PUSCH0 has a larger number of symbols than PUSCH1.

The above prioritizations and combinations of the above prioritizations can also apply for PUCCH transmissions with repetitions. The above prioritizations and combinations of the above prioritizations can apply in a descending order.

Figure 9:
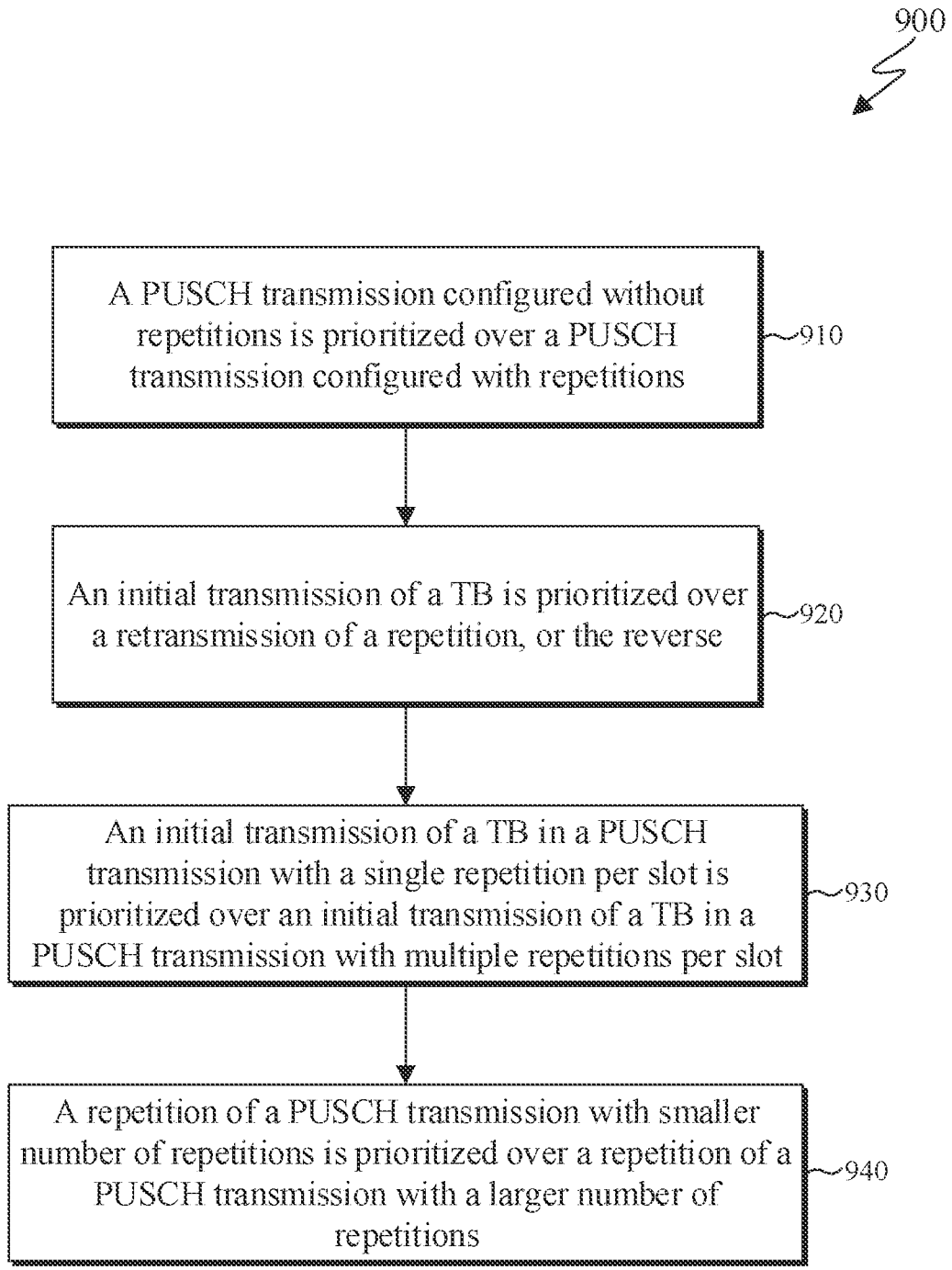
FIG. 9 illustrates an example method of the order in which a set of rules for prioritizing transmission of a PUSCH, among two or more overlapping PUSCH transmissions, can apply according to embodiments of present disclosure.

FIG. 9 illustrates an example method 900 of the order in which a set of rules for prioritizing transmission of a PUSCH, among two or more overlapping PUSCH transmissions, can apply according to embodiments of present disclosure. The steps of the method 900 can be performed by any of the UEs 111-116 of FIG. 1, such as the UE 116 of FIG. 3. The method 900 of FIG. 9 is for illustration only and other embodiments can be used without departing from the scope of the present disclosure.

In step 910, a first rule for transmission prioritization can be that a transmission configured without repetitions is prioritized over a transmission with repetitions. For example, a PUSCH transmission can be configured without repetitions is prioritized over a PUSCH transmission configured with repetitions. When both transmissions are configured with repetitions, other transmission characteristics are considered. For example, a PUSCH transmission that includes an initial transmission of a TB is prioritized over a PUSCH transmission that includes a retransmission of a TB, or the reverse (a retransmission of a TB is prioritized over an initial transmission of a TB). That is, in step 920, an initial transmission of a TB is prioritized over a retransmission of a repetition or the reverse (opposite). In step 930, an initial transmission of a TB in a PUSCH transmission with type A repetition is prioritized over an initial transmission of a TB in a PUSCH transmission with type B repetitions, or in general, when overlapping repetitions of PUSCH transmissions include initial transmissions of a TB, the PUSCH transmission with a single repetition per slot is prioritized. In step 940, when both PUSCH transmissions are with repetitions, the transmission with a smaller number of repetitions is prioritized. For example, a repetition of a PUSCH transmission with smaller number of repetitions is prioritized over a repetition of a PUSCH transmission with a larger number of repetitions.

Although FIG. 9 illustrates the method 900 various changes may be made to FIG. 9. For example, while the method 900 of FIG. 9 is shown as a series of steps, various steps could overlap, occur in parallel, occur in a different order, or occur multiple times. In another example, steps may be omitted or replaced by other steps. For example, steps of the method 900 can be executed in a different order.

In certain embodiments, prioritization is based on whether a PUSCH transmission is configured with repetitions or no repetitions and handling of deprioritized resources. This embodiment is described in the below examples and FIG. 10.

For example, prioritization of overlapping PUCCH or PUSCH transmissions having a same service class priority is considered. A UE can prioritize a PUSCH transmission configured without repetitions over a PUSCH transmission configured with repetitions. For example, if the UE is configured to transmit a first PUSCH with no repetitions and with a first spatial setting (PUSCH 0) and a second PUSCH with repetition type A and with a second spatial setting (PUSCH 1) then, in case the first and second PUSCH transmissions overlap in time, the UE prioritizes the first PUSCH transmission, transmits PUSCH 0, and cancels the transmission of PUSCH 1. If the overlap between PUSCH 0 and PUSCH 1 occurs only for some of the symbols for the transmission of PUSCH 1, the UE can cancel the entire transmission of PUSCH 1. The cancelation may also extend to subsequent repetitions of PUSCH 1. Alternatively, the UE cancels only the PUSCH 1 symbols, or the repetition of the PUSCH 1 transmission, that overlap with the prioritized transmission of PUSCH 0 and transmits symbols of the overlapping repetition, or the non-overlapping repetitions, for PUSCH 1. It is also possible that the UE postpones the overlapping repetition of the PUSCH 1 transmission to a subsequent transmission occasion.

Figure 10:
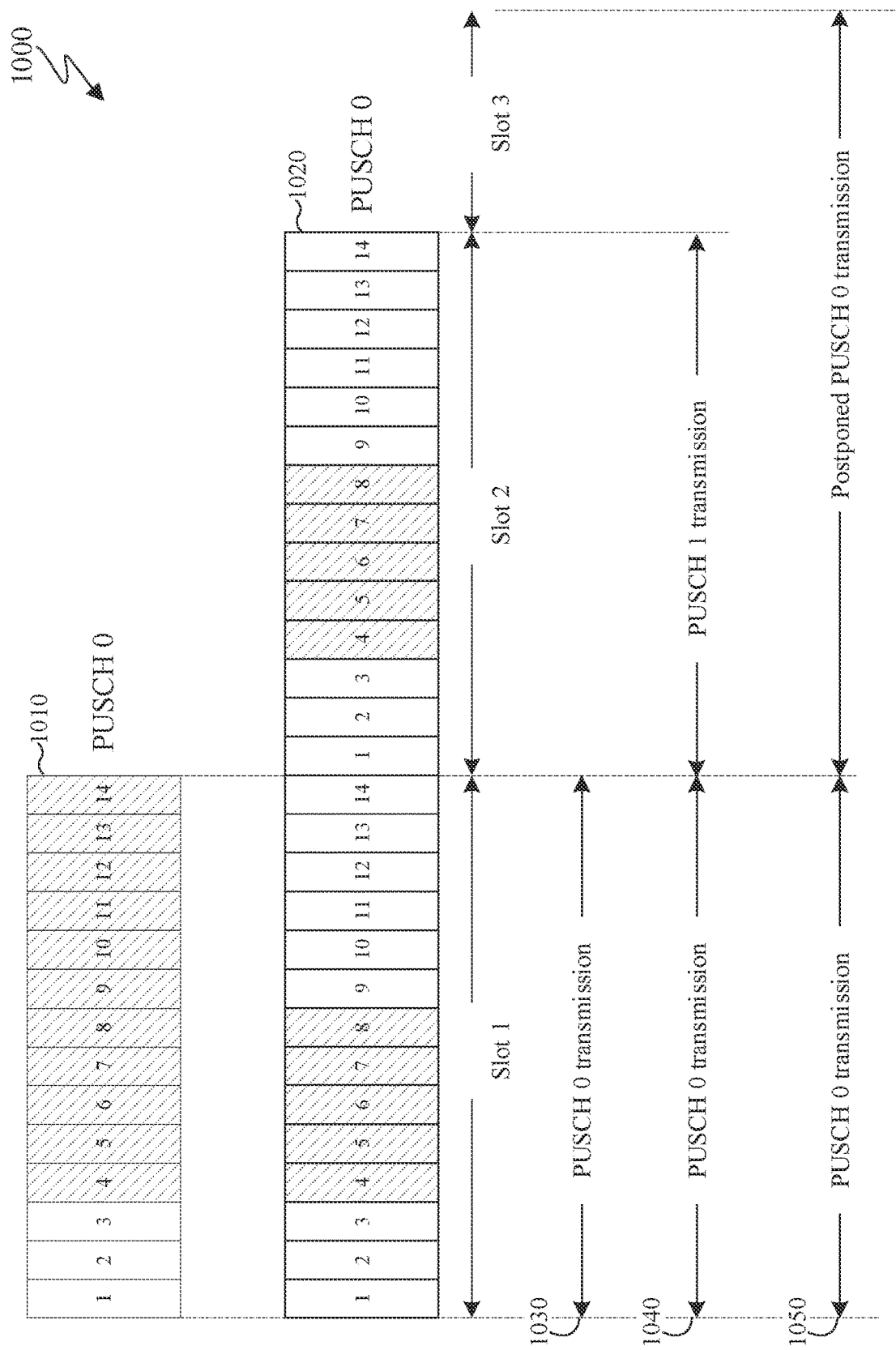
FIG. 10 illustrates an example signal diagram of a first PUSCH transmission and a second PUSCH transmission according to embodiments of present disclosure.

FIG. 10 illustrates an example signal diagram 1000 of a first PUSCH transmission and a second PUSCH transmission according to embodiments of present disclosure. For example, the signal diagram 1000 illustrates an example of a first PUSCH transmission with no repetitions and with a first spatial setting on a first cell and of a second PUSCH transmission with two repetitions and a second spatial setting on a second cell, and of overlapping of the two PUSCH transmissions in a first slot.

In a first slot, a first PUSCH transmission (PUSCH0) 1010 that is without repetitions and with a first spatial setting is over symbols 4 to 14, while a second PUSCH transmission (PUSCH1) 1020 that is with repetitions and with a second spatial setting is over symbols 4 to 8.

In the first slot, the UE transmits the first PUSCH and cancels transmission of the second PUSCH. In second and third slots there is no overlap between the first and second PUSCH transmissions and the transmission of the second PUSCH can be completed or partially canceled. As illustrated, the UE completely cancels the second PUSCH transmission 1030. The UE cancels the first repetition of the second PUSCH transmission only in slot 1 where there is overlapping with the first PUSCH transmission and transmits the second repetition of the second PUSCH transmission in slot 2 1040. The UE postpones the second PUSCH transmission and transmits the two repetitions in slot 2 and slot 3 1050.

In certain embodiments, the UE can postpone transmissions. This embodiment is described in the blow examples and FIG. 11.

For example, when a UE prioritizes a first PUSCH transmission, the UE either cancels PUSCH transmissions that are not prioritized before a first symbol that overlaps with the transmission that has priority or the UE postpones the PUSCH transmissions that are not prioritized after the completion of the PUSCH transmission that has priority.

For a postponed transmission the following rules can apply. A rule can specify that a postponed first repetition has priority over a subsequent repetition. A rule can specify that a postponed repetition i of a PUSCH transmission has priority over a repetition j, with j>i of another PUSCH transmission. A rule can specify that a postponed repetition i of a PUSCH transmission has priority over a postponed repetition j, with j>i of another PUSCH transmission. A rule can specify that when both postponed repetitions are repetitions i (for example both are second repetitions), the repetition with the larger number of symbols is prioritized for transmission. Alternatively, the repetition postponed for a larger number of transmission occasions or slots is transmitted. A rule can specify that a repetition can be postponed for transmission for up to a number of n transmission occasions or slots. After the number of n transmission occasions or slots, the PUSCH repetitions (if any) are dropped. The number of n transmission occasions or slots can be provided to a UE by higher layers or be specified in a system operation.

Figure 11:
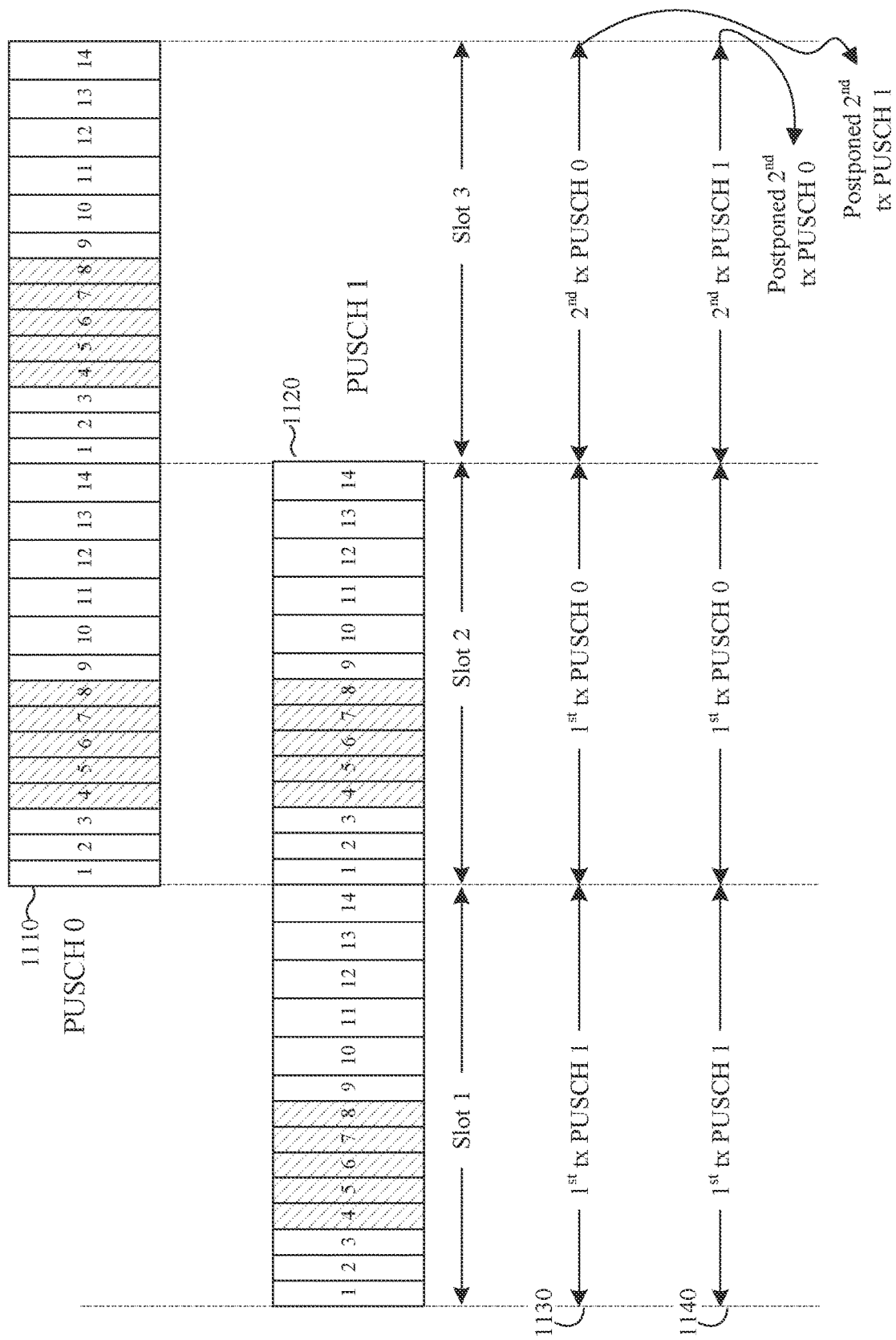
FIG. 11 illustrates an example signal diagram of a first PUSCH transmission and a second PUSCH transmission according to embodiments of present disclosure.

FIG. 11 illustrates an example signal diagram 1100 of a first PUSCH transmission and a second PUSCH transmission according to embodiments of present disclosure. For example, the signal diagram 1100 describes an example of a first PUSCH transmission with 2 repetitions and with a first spatial setting and of a second PUSCH transmission with two repetitions with a second spatial setting, wherein the first and second PUSCH transmissions overlap in second and third slots.

In a first slot, a first repetition of a second PUSCH transmission (PUSCH1) is over symbols 4 to 14 and there is no overlap with other PUSCH transmissions 1110. In a second slot, a repetition of the PUSCH1 transmission overlaps with a first repetition of a first PUSCH transmission (PUSCH0) 1120. A first repetition has priority and the UE transmits the first repetition of the PUSCH0 transmission and postpones the overlapping repetition of the PUSCH1 transmission. In a third slot, a repetition of the PUSCH1 transmission would overlap with a postponed repetition of the PUSCH1 transmission, and both repetitions have a same repetition number equal to 2. If a prioritization based on the larger number of PUSCH symbols is applied, the UE transmits the second repetition for PUSCH0 in the third slot 1130. If instead a prioritization based on the number of postponed transmission occasions is applied, the UE transmits the second repetition of the PUSCH1 transmission in the third slot 1140.

In certain embodiments, a deprioritized PUSCH transmission is canceled. This embodiment is described in the below examples.

For example, a UE (such as the UE 116) can cancel a PUSCH transmission before a first symbol that overlaps with a transmission that has higher priority. In addition to canceling a transmission of lower priority on symbols overlapping with a transmission of higher priority, the UE can also cancel subsequent symbols of the transmission of lower priority. For example, for a PUSCH transmission with repetitions, if the UE cancels a first repetition of the PUSCH transmission, the UE can also cancel remaining repetitions. For another example, if a UE cancels any repetition of a PUSCH transmission, the UE can also cancel all subsequent repetitions of the PUSCH transmission. For another example, when a UE is configured to transmit a first PUSCH with a first spatial setting and a second PUSCH with a second spatial setting, both without repetitions, if the first PUSCH transmission is prioritized and occupies a number of symbols larger than a predetermined or configured number of symbols, the UE can cancel the transmission of the second PUSCH. For yet another example, when a UE is configured to transmit a first PUSCH with a first spatial setting and a second PUSCH with a second spatial setting, both without repetitions, if the PL difference of the first and second spatial setting is larger than a threshold, or the PL of the deprioritized transmission with the second spatial setting is below a threshold, the UE can cancel the transmission of the second PUSCH.

In certain embodiments, a determination is made regarding whether to cancel or postpone deprioritized PUSCH transmissions. This embodiment is described in the below examples and FIG. 12.

Cancelation or postponing of a PUSCH transmission can be associated with the rules for prioritization of a PUSCH transmission. For example, if prioritization of a PUSCH transmission is based on a path loss estimate and overlapping PUSCH transmissions are not configured with repetitions, a UE can cancel a deprioritized PUSCH transmission. If PUSCH transmissions are configured with repetitions and prioritization among overlapping transmissions is based on a repetition number, a UE can cancel an overlapped deprioritized transmission, or postpone a deprioritized PUSCH transmission for a next transmission occasion or for a number of transmission occasions that can be predefined in a system operation or be provided to the UE by higher layers. Similar principles can apply for overlapped PUCCH transmissions.

A gNB (such as the BS 102) can configure by higher layers a UE whether to cancel or postpone PUSCH transmissions that are not prioritized. The gNB can also configure by higher layers the UE whether the cancelation should be over only the overlapping repetitions or for all remaining repetitions after cancelation in a transmission occasion where overlap occurs. When a UE postpones a canceled repetition of a PUSCH transmission, a gNB can configure the UE a number of transmission occasions that the UE can postpone the repetition of the PUSCH transmission before the UE cancels the repetition. The gNB can also configure by higher layers the UE to postpone a PUSCH repetition only for a certain repetition number, such as the first repetition, or a last number of repetitions, or for all repetitions of the PUSCH transmission. Alternatively, or in addition, when a PUSCH transmission is scheduled by a DCI format, the gNB can indicate the UE behavior for postponing or canceling deprioritized repetitions by a field in the DCI format. For example, a 1-bit field can indicate a UE behavior to cancel or postpone PUSCH transmissions that the UE cancels in overlapping transmission occasions.

A gNB can also configure by higher layers a UE whether to cancel or postpone PUSCH transmissions based on the number of PUSCH symbols of an overlapping PUCCH transmission. For example, when a UE is configured to transmit a first PUSCH with a first spatial setting and a second PUSCH with a second spatial setting, and both PUSCH transmissions are configured without repetitions, if the first PUSCH transmission is prioritized and occupies a number of symbols smaller than a predetermined or configured number of symbols, the UE can postpone the transmission of the second PUSCH and transmit the first symbol of the second PUSCH after the last symbol of the first PUSCH. The first symbol of the second PUSCH can be transmitted in a same or different slot of the last symbol of the first PUSCH. It is also possible that the condition for whether canceling or postponing a deprioritized PUSCH transmission is based on whether transmission of the first PUSCH can be completed in a predetermined or configured number of slots, wherein the number of slots can be one or larger than one.

Figure 12:
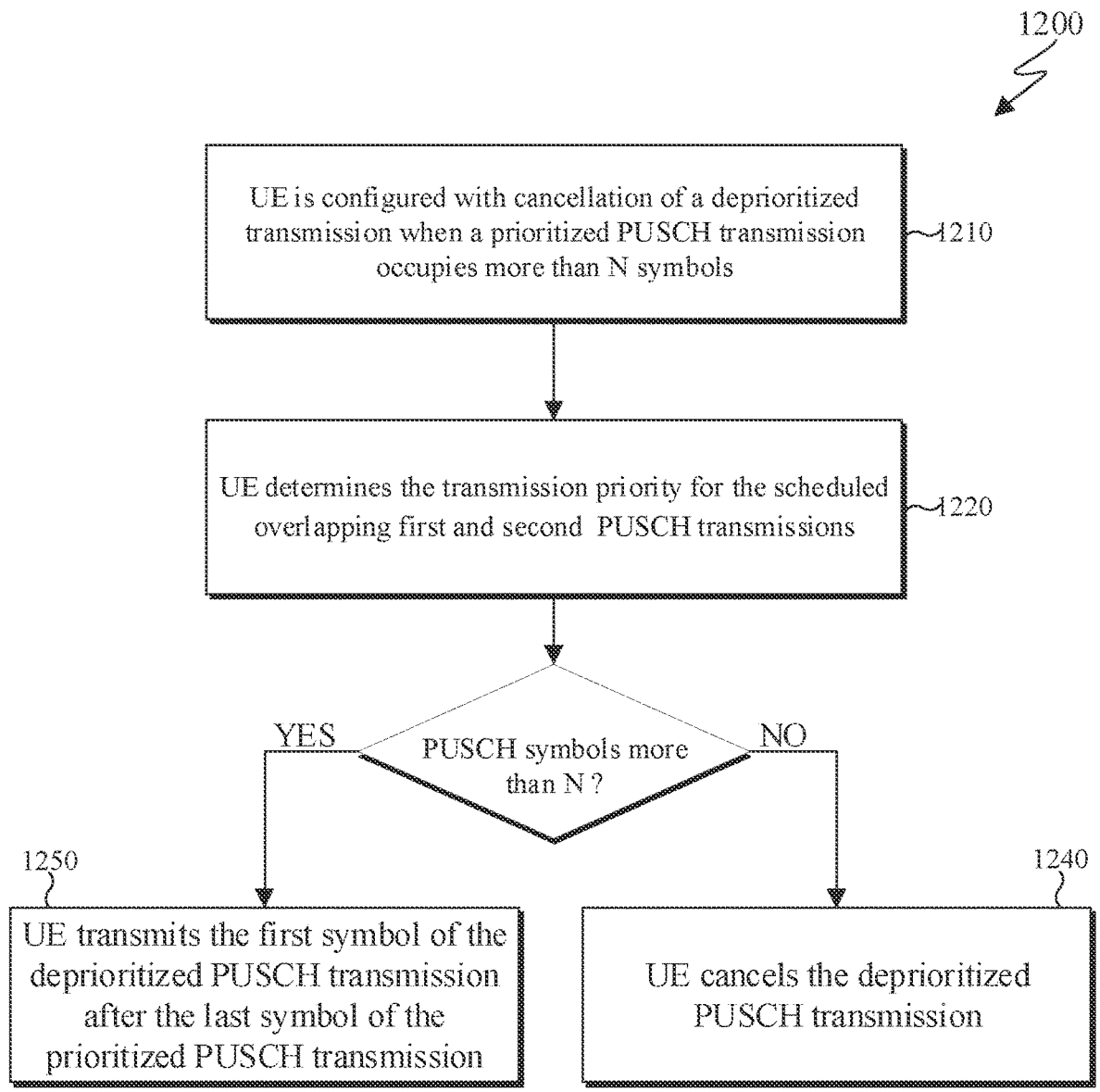
FIG. 12 illustrates an example method for a UE to determine whether to postpone or cancel a PUSCH transmission according to embodiments of present disclosure.

FIG. 12 illustrates an example method 1200 for a UE to determine whether to postpone or cancel a PUSCH transmission according to embodiments of present disclosure. The steps of the method 1200 can be performed by any of the UEs 111-116 of FIG. 1, such as the UE 116 of FIG. 3. The method 1200 of FIG. 12 is for illustration only and other embodiments can be used without departing from the scope of the present disclosure.

In step 1210, a UE is configured with cancelation of a deprioritized transmission when a prioritized PUSCH transmission occupies more than N symbols. In step 1220, the UE determines the transmission priority for the scheduled overlapping first and second PUSCH transmissions. For example, the first PUSCH transmission is prioritized. In step 1230, the UE determines whether the PUSCH symbols are more than N. When the number of symbols of the first prioritized transmission is larger than N (as determined in step 1230), the UE, in step 1240 cancels the deprioritized second PUSCH transmission. Alternatively, when the number of symbols of the first prioritized transmission is not larger than N (as determined in step 1230), the UE in step 1250, transmits the first symbol of the deprioritized second PUSCH transmission after the last symbol of the prioritized first PUSCH transmission.

Although FIG. 12 illustrates the method 1200 various changes may be made to FIG. 12. For example, while the method 1200 of FIG. 12 is shown as a series of steps, various steps could overlap, occur in parallel, occur in a different order, or occur multiple times. In another example, steps may be omitted or replaced by other steps. For example, steps of the method 1200 can be executed in a different order.

In certain embodiments, a gNB determines PUSCH transmission prioritization by a configuration or an indication This embodiment is described in the below examples and FIGS. 13 and 14.

A UE (such as the UE 116) can be configured to transmit a first PUSCH or a first PUCCH with a first spatial setting and a second PUSCH or a second PUCCH with a second spatial setting, and the UE can transmit simultaneously the transmissions with the two spatial settings. The transmission with the two spatial settings can be on different cells or can correspond to different reception points of a same cell.

A gNB can configure a UE with prioritization of transmission of a first PUSCH with a first spatial setting over transmission of a second PUSCH with a second spatial setting. It is also possible that the gNB can configure by higher layers the UE with prioritization for different channels with different spatial settings. For example, a PUSCH transmission with a first spatial setting can be prioritized over an overlapping PUCCH transmission with a second spatial setting. Alternatively, or in addition, the gNB can indicate the UE behavior by a field in a DCI format scheduling the PUSCH or PUCCH transmission. For example, a 1-bit field in the DCI format scheduling a first PUSCH transmission can indicate that the PUSCH transmission is prioritized over a second PUSCH transmission. For example, the UE can receive the DCI format on a cell of a MCG and the indication can be whether the PUSCH or PUCCH transmission is prioritized over a transmission on a cell of a SCG.

Figure 13:
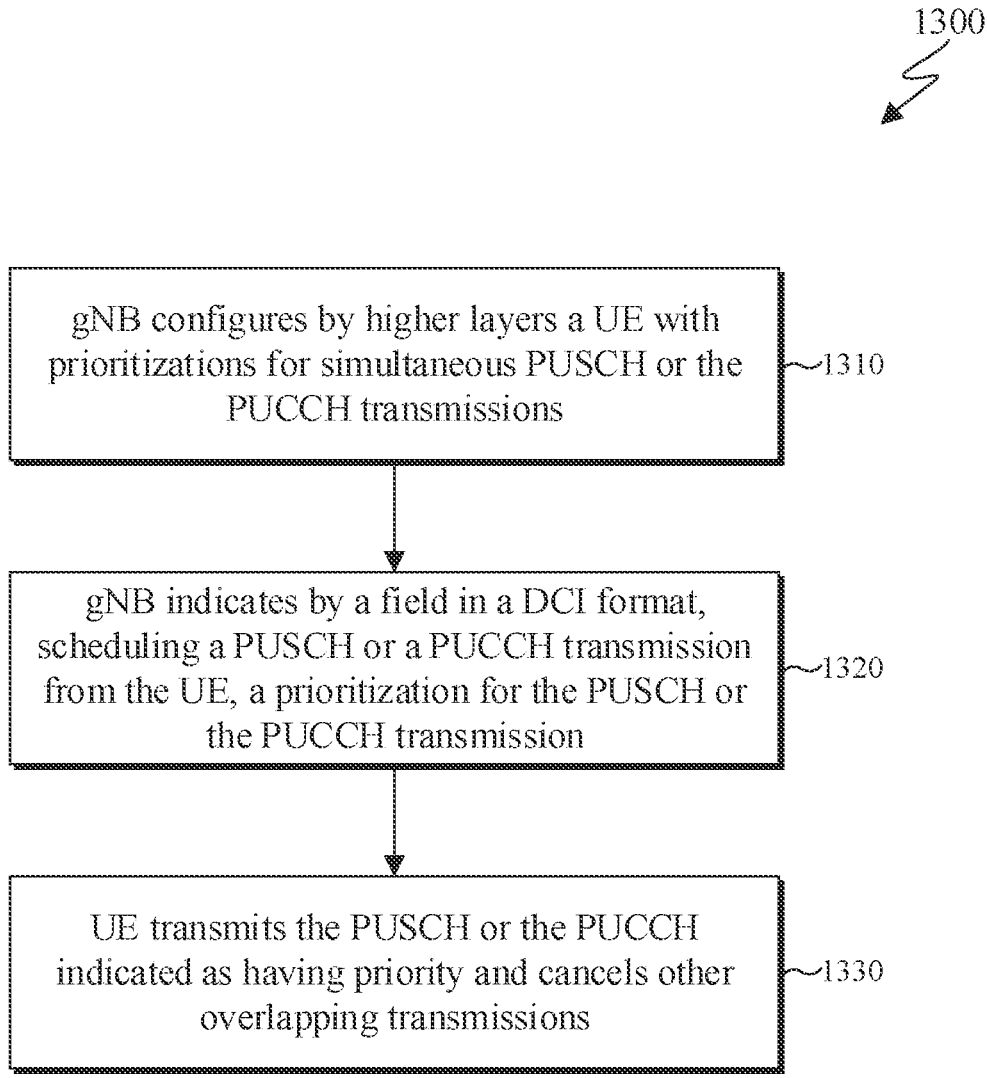
FIG. 13 illustrates an example method for a UE to determine a priority for a PUSCH transmission according to embodiments of present disclosure.

FIG. 13 illustrates an example method 1300 for a UE to determine a priority for a PUSCH transmission according to embodiments of present disclosure. The steps of the method 1300 can be performed by any of the UEs 111-116 of FIG. 1, such as the UE 116 of FIG. 3 and/or by a base station such as BS 102. The method 1300 of FIG. 13 is for illustration only and other embodiments can be used without departing from the scope of the present disclosure.

In step 1310, a gNB (such as the gNB 102) can configure by higher layers a UE with prioritizations for simultaneous PUSCH or the PUCCH transmissions. For example, the PUSCH transmissions can be associated with different spatial settings and the UE is not capable of simultaneously transmitting with more than one spatial setting. In step 1320, the gNB indicates by a field in a DCI format, scheduling a PUSCH or a PUCCH transmission from the UE, a prioritization for the PUSCH or the PUCCH transmission. In step 1330, the UE transmits the PUSCH or the PUCCH indicated as having priority and cancels other overlapping transmissions. It is noted that the other overlapping transmissions can have a different spatial setting than the prioritized PUSCH or PUCCH.

Figure 14:
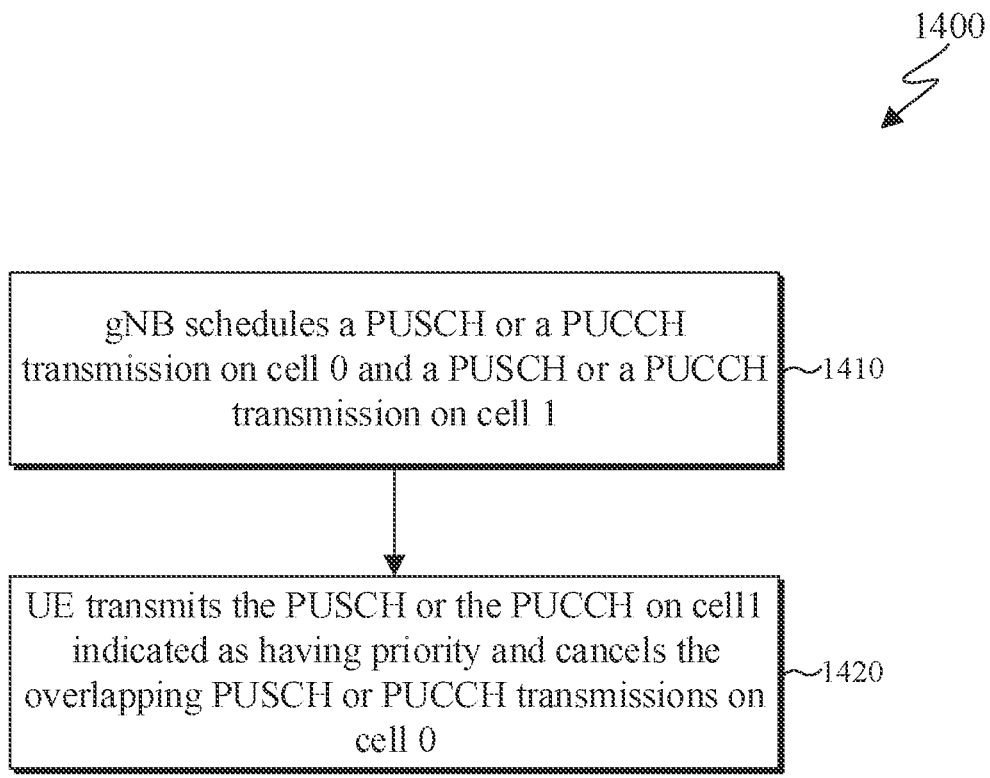
FIG. 14 illustrates example method for a UE to determine a priority for a PUSCH or a physical uplink control channel (PUCCH) transmission according to embodiments of present disclosure.

FIG. 14 illustrates example method 1400 for a UE to determine a priority for a PUSCH or a PUCCH transmission according to embodiments of present disclosure. For example, the method 1400 describes a procedure for a UE to determine a priority for a PUSCH or a PUCCH transmission, when a UE is scheduled to transmit a first PUSCH or a PUCCH on cell 0 and a second PUSCH or a PUCCH on cell 1. The steps of the method 1400 can be performed by any of the UEs 111-116 of FIG. 1, such as the UE 116 of FIG. 3 and/or by a base station such as BS 102. The method 1400 of FIG. 14 is for illustration only and other embodiments can be used without departing from the scope of the present disclosure.

In step 1410, a gNB schedules a PUSCH or a PUCCH transmission on cell 0 and a PUSCH or a PUCCH transmission on cell 1. In step 1420, the UE transmits the PUSCH or the PUCCH on cell 1 when indicated as having priority and cancels the overlapping PUSCH or PUCCH transmissions on cell 0.

Although FIGS. 13 and 14 illustrate the methods 1300 and 1400 various changes may be made to FIGS. 13 and 14. For example, while the method 1300 of FIG. 13 is shown as a series of steps, various steps could overlap, occur in parallel, occur in a different order, or occur multiple times. In another example, steps may be omitted or replaced by other steps. For example, steps of the method 1300 can be executed in a different order.

Embodiments of the present disclosure also relate to transmissions from a UE operating on multiple cells, such as for operation with carrier aggregation, or operating with multiple TRPs wherein a TRP is defined by a spatial setting for a reception by the UE (transmission point) or for a transmission from the UE (reception point). The disclosure relates to determining prioritizations for power reductions for PUSCH and PUCCH transmissions with different spatial settings on different cells or carriers. The disclosure also relates to configuring and indicating transmission prioritizations for a UE. The disclosure also relates to determining a power of PUSCH transmission with a spatial setting. The disclosure additionally relates to determining a power of a PUCCH transmission with a spatial setting. The disclosure further relates to determining prioritizations for transmissions with repetitions for a UE.

In the following, for brevity, the descriptions consider transmissions from a UE to two different serving cells but are directly applicable to two different reception points of a same serving cell.

For example, when a UE (such as the UE 116) transmits only with one spatial setting on a cell at a time, scheduling decisions can be independent per spatial setting. A UE can be scheduled by a downlink control information (DCI) format in a physical downlink control channel (PDCCH) for reception or transmission according to one of multiple spatial settings. Such dynamic scheduling enables a gNB to schedule the UE using a spatial setting that offers channel conditions facilitating reliable transmissions or receptions for the UE at any given time and to perform dynamic load balancing among different spatial dimensions.

A UE can determine a power for PUSCH, PUCCH, SRS or PRACH transmission based on pathloss estimate(s) computed by the UE and subject to a UE maximum transmission power in a transmission occasion. A UE that is capable to communicate with multiple TRPs can receive PDCCHs from the multiple TRPs at same or different PDCCH monitoring occasions (MOs). For example, when multiple TRPs are connected by a non-ideal backhaul, a UE can receive multiple PDCCHs, scheduling corresponding PDSCH receptions, from the multiple spatial settings; otherwise, in case of negligible backhaul latency, a single PDCCH can schedule receptions at the UE of multiple PDSCHs using multiple spatial settings. For determining a PUSCH, PUCCH, SRS or PRACH transmission power, the UE can use pathloss estimate(s) that the UE computes based on RS receptions using multiple spatial settings subject to a UE maximum transmission power in a transmission occasion.

Embodiments of the present disclosure describe prioritizations for transmission power reductions for PUSCH transmissions with different spatial settings on different cells or carriers. This is described in the below examples.

When a UE is configured for operation on one or more cells, the UE is provided or determines spatial settings to use for transmissions on the one or more cells or carriers. For example, a UE can be configured to transmit on cell 1 with spatial setting 1 and on cell 2 with spatial setting 2, wherein cell 1 and cell 2 can be a same cell or different cells. A UE can transmit simultaneously on cell 1 and on cell 2. For example, a UE can have two panels and transmit simultaneously from the two panels, for example with panel 1 transmitting on cell 1 and panel 2 transmitting on cell 2 at any given time. A UE transmission in a transmission occasion can be a combination of different channels or signals such as PUSCH or PUCCH or PRACH or SRS. For example, in a combination a UE can transmit a first PUSCH on cell 1 (PUSCH1) and a second PUSCH on cell 2 (PUSCH2). In another combination, a UE can transmit a first PUCCH on cell 1 (PUCCH1) and a second PUCCH on cell 2 (PUCCH2). In another combination, a UE can transmit a first PUSCH on cell 1, a second PUSCH on cell 2, and a PUCCH on cell 1. In another combination a UE can transmit a first PUCCH on cell 1, a second PUCCH on cell 2, and a SRS on cell 2. When a total UE transmit power for PUSCH or PUCCH or PRACH or SRS transmissions would exceed a maximum transmit power $P_{CMAX}$ at a given time, the UE allocates power to PUSCH/PUCCH/PRACH/SRS transmissions according to a priority order (in descending order) so that the total UE transmit power for transmissions on serving cells in the frequency range is smaller than or equal to $P_{CMAX}$ for that frequency range in every symbol of a transmission occasion, wherein the $P_{CMAX}$ is applicable for all transmissions regardless or corresponding spatial settings. A transmission occasion can be a slot or a group of consecutive symbols of length l, l≥1.

Regarding PUSCH transmissions, when a UE is configured to transmit a PUSCH on cell 1 and a PUSCH on cell 2, and different spatial settings are used for the PUSCH transmissions on cell 1 and on cell 2, the UE prioritizes power allocation for PUSCH transmission on the cell where the UE is configured to transmit PUCCH. Alternatively, if PUCCH transmissions are configured on both cells, or on none of the cells, or regardless of configuration of PUCCH transmissions on the cells where the UE transmits PUSCHs at a given time, the UE can prioritize power allocation for PUSCH transmissions on the cell with a smaller index, or can apply equal power allocation to all PUSCH transmissions, or the prioritization of power allocation can be left to UE implementation. The UE can also apply prioritizations for transmission power reductions by considering whether or not a PUSCH transmission is configured with repetitions, after possible prioritizations related to the information in a PUSCH, such as UCI multiplexing in the PUSCH. When a UE is configured to transmit PUSCH with repetitions, a priority order for transmission power allocation can consider one or more of whether a PUSCH repetition is a type A or type B, a configured number of repetitions, a repetition number in a transmission occasion, a position of a first PUSCH symbol of a repetition, a number of PUSCH symbols per repetition, and a number of PUSCH symbols per slot.

The following describe PUCCH transmissions. The above prioritizations for power reductions of PUSCH transmissions when a UE is configured to transmit a first PUSCH on cell 1 and a second PUSCH on cell 2, wherein a first spatial setting for the first PUSCH is same or different than a second spatial setting for the second PUSCH, can also apply for PUCCH transmissions when the UE is configured to transmit a first PUCCH on cell 1 and a second PUCCH on cell 2. A UE prioritizes power allocation to a PUCCH transmission that includes HARQ-ACK information over a PUCCH transmission that includes scheduling information that is in turn prioritized over a PUCCH transmission that includes only CSI.

For example, when a UE is configured for operation on one or more cells and the UE can transmit simultaneously with different spatial settings on different cells, prioritizations for transmission power reductions can be determined based on a one or more configured maximum power per cell and/or per TRP and/or per multiple TRPs. For example, a UE is configured to transmit on cell 1 with a first spatial setting and a second spatial setting and on cell 2 with a third spatial setting. The UE can first determine the required powers of each of the transmissions with different spatial settings in a transmission occasion according to a dynamic or configured scheduled transmission and then, if necessary, apply a scaling to the power of each transmission with a different spatial setting in order to not exceed a configured maximum power. The configured maximum power can be configured per TRP/spatial setting or per multiple TRPs/spatial settings. It is also possible that a UE is configured with a maximum power per cell that is applied in addition to a maximum power per TRP/spatial setting or is applied alternatively or in addition to the maximum power per multiple TRPs/spatial settings.

For the above example, in one sub-example, the UE transmits one or more channels on cell 1 with a first spatial setting and a second spatial setting, and one or more channels on cell 2 with a third spatial setting, when the sum of the transmission powers used for spatial settings 1 and 2 does not exceed the configured maximum power per cell, when the transmission power used for spatial setting 3 does not exceed the configured maximum power per cell. The UE also transmits one or more channels in cell 2 with a third spatial setting when a power that does not exceed the configured maximum power per cell. In another sub example, the UE transmit one or more channels with each of the spatial settings when a power does not exceed the configured maximum power per TRP/spatial setting and does not exceed the maximum power per multiple TRPs/spatial settings.

Figure 15:
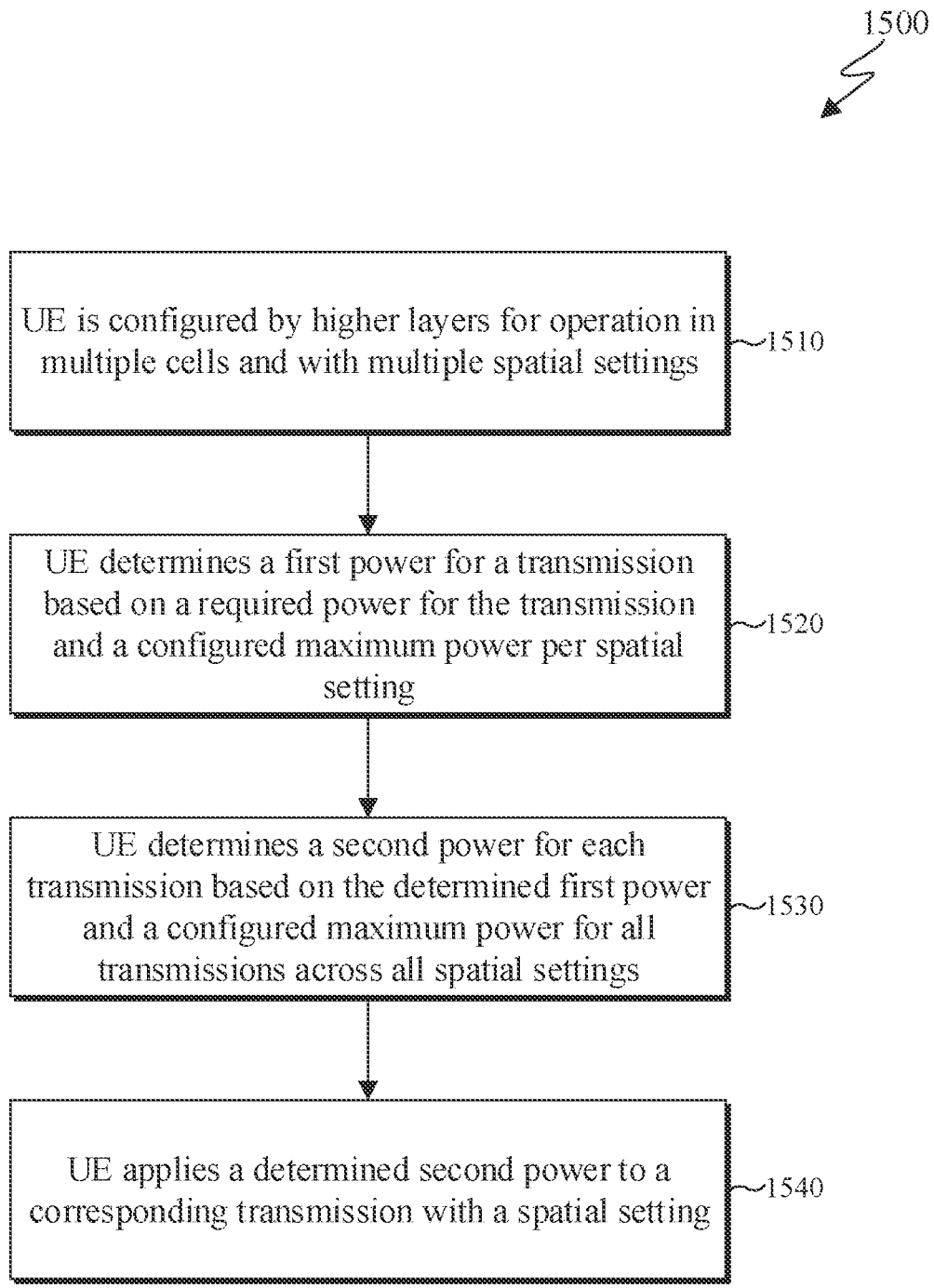
FIG. 15 illustrates an example method for a UE determining prioritizations for power reductions for PUSCH transmissions on a cell or carrier according to embodiments of present disclosure.

FIG. 15 illustrates an example method 1500 for a UE determining prioritizations for power reductions for PUSCH transmissions on a cell or carrier according to embodiments of present disclosure. The steps of the method 1500 can be performed by any of the UEs 111-116 of FIG. 1, such as the UE 116 of FIG. 3. The method 1500 of FIG. 15 is for illustration only and other embodiments can be used without departing from the scope of the present disclosure.

In step 1510, a UE (such as the UE 116) UE is configured by higher layers for operation on multiple cells and to transmit with multiple spatial settings. In step 1520, the UE determines a first power for each transmission with a spatial setting based on a required power for the scheduled or configured transmission and a configured maximum power for the spatial setting. In step 1530, the UE determines a second power for each transmission based on the determined first powers subject to a configured maximum power for all transmissions across all spatial settings. In step 1540, the UE applies a determined second power to a corresponding transmission with a spatial setting.

Although FIG. 15 illustrates the method 1500 various changes may be made to FIG. 15. For example, while the method 1500 of FIG. 15 is shown as a series of steps, various steps could overlap, occur in parallel, occur in a different order, or occur multiple times. In another example, steps may be omitted or replaced by other steps. For example, steps of the method 1500 can be executed in a different order.

For yet another example, a UE can be configured to transmit on cell 1 with a first spatial setting and a second spatial setting, and on cell 2 with a third spatial setting. The UE can allocate power in order to have a different partition of the transmission power in a transmission occasion to cell 1 and to cell 2. The UE transmits on cell 1 with a first spatial setting and a second spatial setting wherein the sum of the powers for the transmissions with the two spatial settings is equal to the transmission power on cell 2 with the third spatial setting. On cell 1, the UE can partition the power between the two transmissions with the first and second spatial settings equally, or based on the UE implementation, or based on the contents of the two transmissions.

Embodiments of the present disclosure also describe prioritizations for transmission power reductions by gNB configurations or indications. This is described in the below examples and FIGS. 16 and 17.

For example, regarding a configuration for transmissions on two cells, a UE (such as the UE 116) can be configured to transmit a first PUSCH or a first PUCCH with a first spatial setting on cell 1 and a second PUSCH or a second PUCCH with a second spatial setting on cell 2, and the UE is capable to transmit simultaneously with the first and second spatial settings. Cell 1 can be same as or different than cell 2. A gNB (such as the BS 102) can configure by higher layers to the UE a prioritization of power allocation for the first PUSCH transmission on cell 1 and for the second PUSCH transmission on cell 2. The gNB can also configure by higher layers to the UE a prioritization of power allocation for transmission of the first PUCCH on cell 1 and of the second PUCCH transmission on cell 2. It is also possible that the gNB configures by higher layers the UE prioritizations for power allocation for transmissions on different cells and for transmissions of different channels on a same cell. Such configuration can be useful depending on the channel conditions on the different cells or depending on spatial settings, and on the performance requirements of the different channels for a given service. Alternatively, or in addition, the gNB can indicate the UE behavior by a field in a DCI format scheduling a PUSCH transmission or a PUCCH transmission. For example, a 1-bit field in a DCI format scheduling a PUSCH transmission can indicate that the PUSCH transmission is prioritized when applying transmission power reductions over transmission of other channels/signals, or is prioritized over transmission of another PUSCH in another cell or carrier or with another spatial setting. For PUSCH transmissions on multiple cells, the field can include more than one bits each corresponding to a group of cells from the one or more cells wherein, for example, the gNB can configure each group of cells by higher layer signaling.

Figure 16:
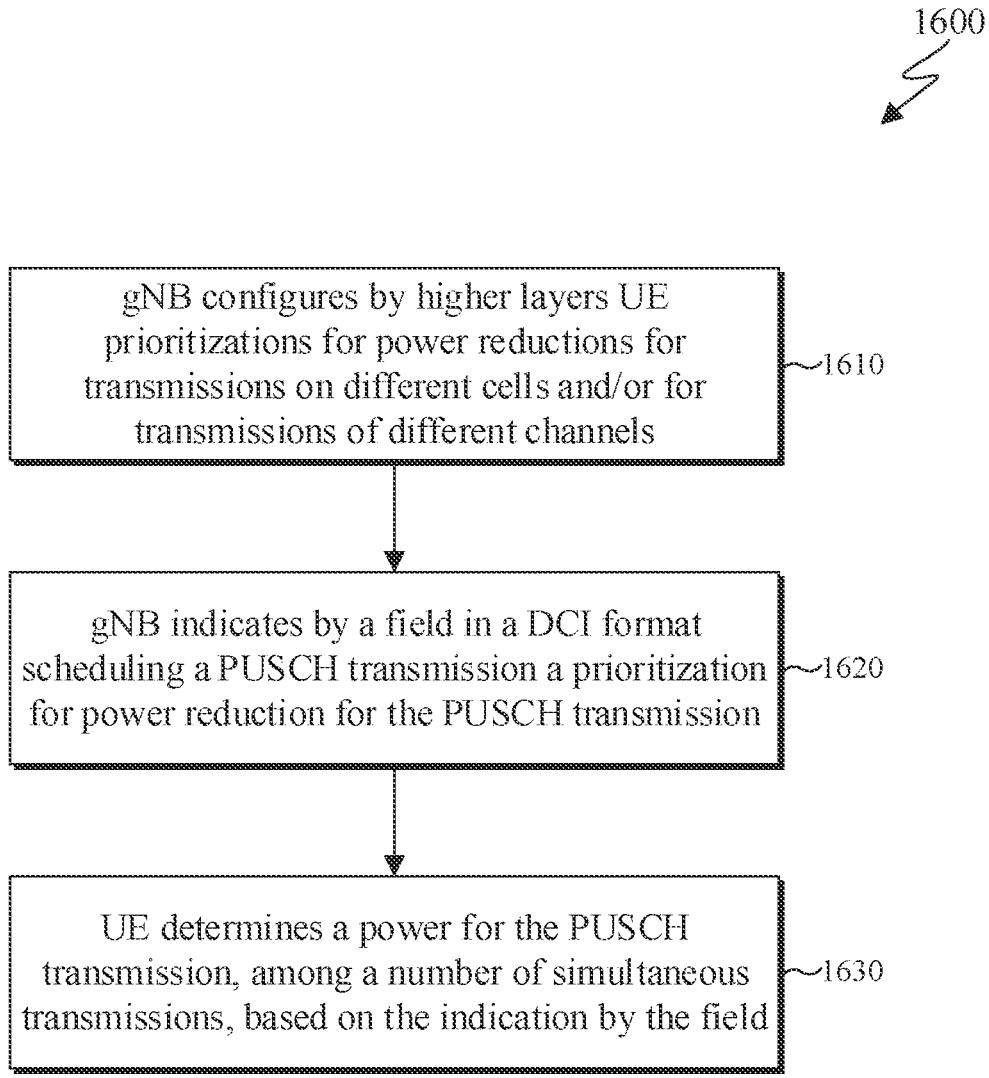
FIG. 16 illustrates an example method for a UE determining prioritizations for power reductions for transmissions of PUSCHs on different cells according to embodiments of present disclosure.
Figure 17:
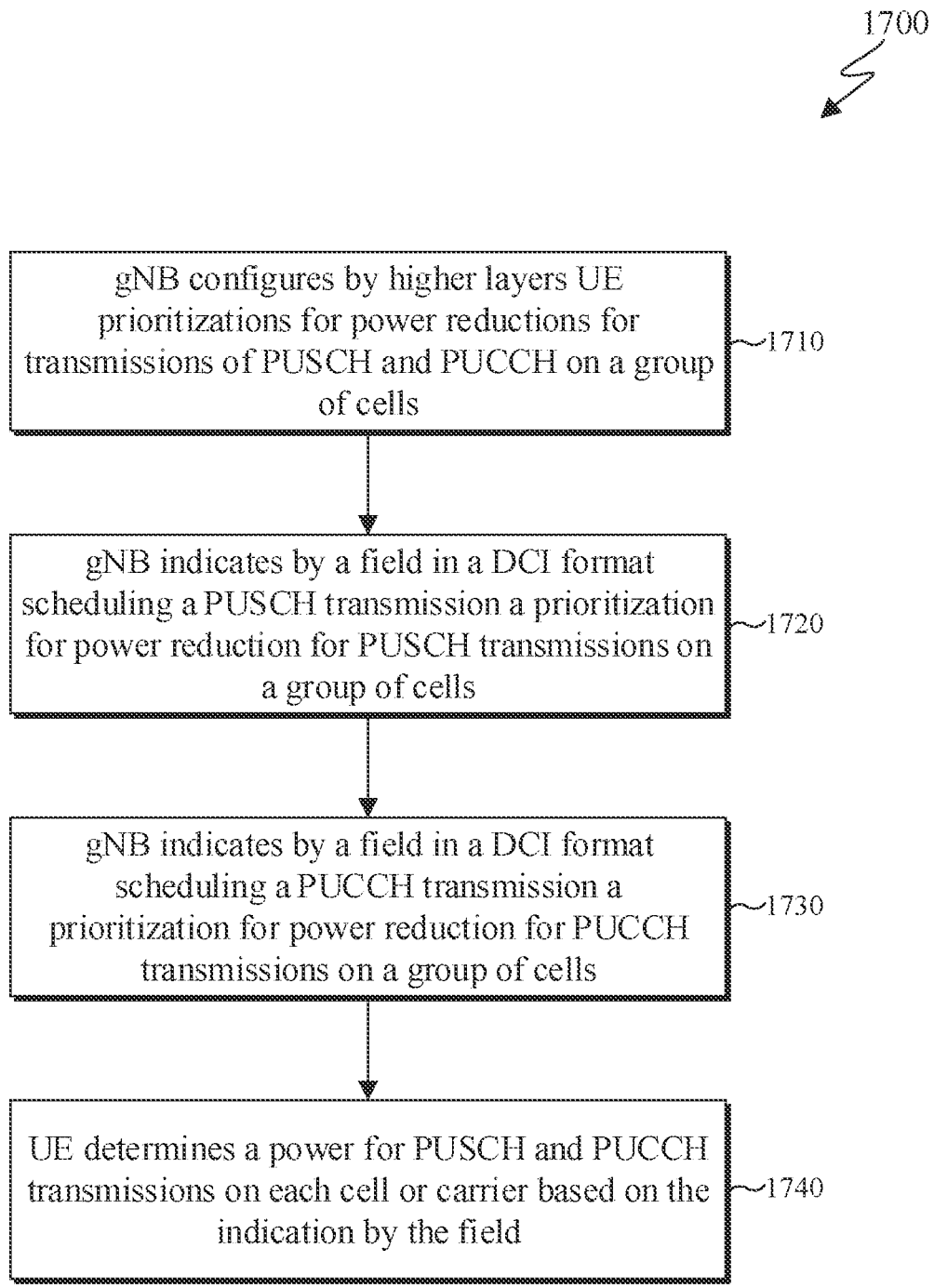
FIG. 17 illustrates an example method for a UE determining the prioritizations for power reductions for transmission of PUSCH and PUCCH on a cell according to embodiments of present disclosure.

FIG. 16 illustrates an example method 1600 for a UE determining prioritizations for power reductions for transmissions of PUSCHs on different cells according to embodiments of present disclosure. FIG. 17 illustrates an example method 1700 for a UE determining the prioritizations for power reductions for transmission of PUSCH and PUCCH on a cell according to embodiments of present disclosure. The steps of the methods 1600 and 1700 can be performed by any of the UEs 111-116 of FIG. 1, such as the UE 116 of FIG. 3 and/or by a base station such as BS 102. The method 1600 of FIG. 16 and the method 1700 of FIG. 17 are for illustration only and other embodiments can be used without departing from the scope of the present disclosure.

As illustrated in the method 1600 of FIG. 16, a gNB (such as the BS 102) can configure by higher layers to a UE prioritizations for power reductions for transmissions on different cells and/or for transmissions of different channels/signals within a cell (step 1610). In step 1620, the gNB can indicate by a field in DCI format scheduling a PUSCH transmission on a cell, a prioritization for power reductions for the PUSCH transmission on the cell. In step 1630, the UE determines a power for the PUSCH transmission based on prioritizations for power allocations among simultaneous transmissions and subject to a limit for a UE maximum transmission power. The simultaneous transmissions can be with a same or with different spatial settings.

As illustrated in the method 1700 of FIG. 17, a gNB (such as the BS 102) can configure by higher layers to a UE prioritizations for power reductions for transmissions of PUSCH and PUCCH on a group of cells. For example, PUSCH transmissions are with different spatial settings on different cells and PUCCH transmissions are with a same spatial setting as PUSCH transmissions on a same cell. In step 1720, the gNB can indicate by a field in DCI format scheduling a PUSCH transmission on a first cell, a prioritization for power reductions for the PUSCH transmissions on a group of cells. In step 1730, the gNB can indicate by a field in DCI format scheduling a PUCCH transmission on a first cell, a prioritization for power reductions for PUCCH transmissions on a group of cells. In step 1740, the UE (such as the UE 116) determines a power for the PUSCH or PUCCH transmission on each cell based on prioritizations for power allocations among simultaneous transmissions and subject to a limit for a UE maximum transmission power.

Although FIGS. 16 and 17 illustrates the methods 1600 and 1700 various changes may be made to FIGS. 16 and 17. For example, while the method 1700 of FIG. 17 is shown as a series of steps, various steps could overlap, occur in parallel, occur in a different order, or occur multiple times. In another example, steps may be omitted or replaced by other steps. For example, steps of the method 1700 can be executed in a different order.

Embodiments of the present disclosure also describe power determination for PUSCH transmissions with different spatial settings. This is described in the below examples.

A UE (such as the UE 116) can transmit PUSCH, PUCCH, SRS, or PRACH using different spatial settings and determine a power for a PUSCH, PUCCH, SRS or PRACH transmission. The determined power can be based on pathloss estimate(s) computed by the UE from receptions of reference signals, such as a SS/PBCH block or a CSI-RS, that are associated with a corresponding spatial setting subject to a UE maximum transmission power in a transmission occasion. The following description of the determination of a PUSCH transmission power for transmission with spatial setting p refers to a UE transmitting in an active UL BWP b of carrier f and spatial setting p of serving cell c.

On an active UL BWP b of carrier f of serving cell c and for spatial setting p, a UE determines a power $P_{PUSCH,p}(i)$ for a PUSCH transmission with spatial setting p in a PUSCH transmission occasion i as a minimum value between a configured maximum power for spatial setting p in PUSCH transmission occasion i, $P_{PUSCH\_MAX,p}(i)$ and a power as described in Equation (1).

$$P_{PUSCH,b,f,p}(i,j,q_d,l) = P_{O\_PUSCH,b,f,p}(j) + 10\log_{10}(2^{\mu} \cdot M_{RB,b,f}(i)) + \alpha_{b,f,p}(j) \cdot PL_{b,f,p}(q_d) + \Delta_{b,f,p}(i) + f_{b,f,p}(i,l) \quad (1)$$

Here, j is the parameter set configuration index, $q_d$ is the RS index for the active DL BWP, l is the PUSCH power control adjustment state index, e.g., for a closed loop power control (CLPC) adjustment state. The expression, $P_{O\_PUSCH,b,f,p}$ is a power value configured by a gNB per spatial setting p. The expression, $M_{RB,b,f}$ is the bandwidth of the PUSCH resource assignment, $\mu$ is a SCS configuration. The expression, $PL_{b,f,p}$ is a pathloss level measured by a UE based on RS reception associated with spatial setting p. The expression, $\alpha_{b,f,p}$ is a weighting factor representing a compensation for the pathloss configured by gNB and can be provided separately per spatial setting p. The expression, $\Delta_{b,f,p}(i)$ is an MCS-dependent offset of data transmitted configured by gNB and is computed separately for each transmission with spatial setting p. The expression, $f_{b,f,p}(i)$ is a transmission power control value in the transmission occasion i and can be maintained per spatial setting p.

In Equation (1), above, $P_{O\_PUSCH,b,f,p}(j)$ is a parameter composed of the sum of a component $P_{O\_NOMINAL\_PUSCH,f,p}(j)$ and a component $P_{O\_UE\_PUSCH,b,f,p}(j)$. It is noted that $j \in \{0, 1, \ldots, J-1\}$.

For example, when a UE established dedicated RRC connection using a Type-1 random access procedure, and is not provided P0-PUSCH-AlphaSet or for a PUSCH transmission scheduled by a RAR UL grant, for Equation (1), above, the following expressions can be defined as: (i) j=0, (ii) $P_{O\_UE\_PUSCH,b,f,p}(0)=0$, and (iii) $P_{O\_NOMINAL\_PUSCH,f,p}(0)=P_{O\_PRE}+\Delta_{PREAMBLE\_Msg3}$. Here, $P_{O\_PRE}$ is provided by preambleReceivedTargetPower, and $\Delta_{PREAMBLE\_Msg3}$ is provided by msg3-DeltaPreamble, or $\Delta_{PREAMBLE\_Msg3}=0$ dB if msg3-DeltaPreamble is not provided, for carrier f of spatial setting p.

For example, when a UE established dedicated RRC connection using a Type-2 random access procedure, and is not provided P0-PUSCH-AlphaSet, or for a PUSCH transmission for Type-2 random access procedure, for Equation (1), above, the following expressions can be defined as: (i) j=0, (ii) $P_{O\_UE\_PUSCH,b,f,p}(0)=0$, and (iii) $P_{O\_NOMINAL\_PUSCH,f,p}(0)=P_{O\_PRE}+\Delta_{MsgA\_PUSCH}$. Here, $P_{O\_PRE}$ is provided by preambleReceivedTargetPower, and $\Delta_{MsgA\_PUSCH}$ is provided by msgADeltaPreamble, or $\Delta_{MsgA\_PUSCH}=\Delta_{PREAMBLE\_Msg3}$ dB if msgADeltaPreamble is not provided, for carrier f of spatial setting p.

For a PUSCH (re)transmission configured by ConfiguredGrantConfig, j=1, $P_{O\_NOMINAL\_PUSCH,f,p}(1)$ is provided by p0-NominalWithoutGrant, or $P_{O\_NOMINAL\_PUSCH,f,p}(1)=P_{O\_NOMINAL\_PUSCH,f,p}(0)$ if p0-NominalWithoutGrant is not provided, and $P_{O\_UE\_PUSCH,b,f,p}(1)$ is provided by p0 obtained from p0-PUSCH-Alpha in ConfiguredGrantConfig that provides an index P0-PUSCH-AlphaSetId to a set of P0-PUSCH-AlphaSet for active UL BWP b of carrier f of spatial setting p.

Similarly, for $j \in \{2, \ldots J-1\} = S_j$, a $P_{O\_NOMINAL\_PUSCH,f,p}(j)$ value, applicable for all $j \in S_j$, is provided by p0-NominalWithGrant, or $P_{O\_NOMINAL\_PUSCH,f,p}(1)=P_{O\_NOMINAL\_PUSCH,f,p}(0)$ if p0-Nominal With Grant is not provided, for each carrier f of spatial setting p and a set of $P_{O\_UE\_PUSCH,b,f,p}(j)$ values are provided by a set of p0 in P0-PUSCH-AlphaSet indicated by a respective set of p0-PUSCH-AlphaSetId for active UL BWP b of carrier f of spatial setting p.

If the UE is provided by SRI-PUSCH-PowerControl more than one values of p0-PUSCH-AlphaSetId and if a DCI format scheduling the PUSCH transmission includes a SRI field, then the UE obtains a mapping. The mapping can be from sri-PUSCH-PowerControlId in SRI-PUSCH-PowerControl between a set of values for the SRI field in the DCI format and a set of indexes provided by p0-PUSCH-AlphaSetId that map to a set of P0-PUSCH-AlphaSet values and determines the value of $P_{O\_UE\_PUSCH,b,f,p}(j)$ from the p0-PUSCH-AlphaSetId value that is mapped to the SRI field value. If the DCI format also includes an open-loop power control parameter set indication field and a value of the open-loop power control parameter set indication field is '1', the UE determines a value of $P_{O\_UE\_PUSCH,b,f,p}(j)$ from a first value in P0-PUSCH-Set-r16 with a p0-PUSCH-SetId-r16 value mapped to the SRI field value.

If the PUSCH transmission except for the PUSCH retransmission corresponding to a RAR UL grant is scheduled by a DCI format that does not include an SRI field, or if SRI-PUSCH-PowerControl is not provided to the UE, j=2. Then If P0-PUSCH-Set is provided to the UE and the DCI format includes an open-loop power control parameter set indication field, the UE determines a value of $P_{O\_UE\_PUSCH,b,f,p}(j)$ from (i) a first P0-PUSCH-AlphaSet in p0-AlphaSets if a value of the open-loop power control parameter set indication field is '0' or '00', (ii) a first value in P0-PUSCH-Set with the lowest p0-PUSCH-SetID value if a value of the open-loop power control parameter set indication field is '1' or '01', (iii) a second value in P0-PUSCH-Set with the lowest p0-PUSCH-SetID value if a value of the open-loop power control parameter set indication field is '10'. Otherwise, the UE determines $P_{O\_UE\_PUSCH,b,f,p}(j)$ from the value of the first P0-PUSCH-AlphaSet in p0-AlphaSets.

For $a_{b,f,p}(j)$, where j=0, if $P_{O\_NOMINAL\_PUSCH,f,p}(0)=P_{O\_PRE}\Delta_{MsgA\_PUSCH}$ and msgA-Alpha is provided, then $a_{b,f,p}(0)$ is the value of msgA-Alpha. Alternatively, if $P_{O\_NOMINAL\_PUSCH,f,p}(0)=P_{O\_PRE}+\Delta_{PREAMBLE\_Msg3}$ or msgA-Alpha is not provided, and msg3-Alpha is provided, then $a_{b,f,p}(0)$ is the value of msg3-Alpha. Otherwise, $a_{b,f,p}(0)=1$.

For $a_{b,f,p}(j)$, where l=1, $a_{b,f,p}(1)$ is provided by alpha obtained from p0-PUSCH-Alpha in ConfiguredGrantConfig providing an index P0-PUSCH-AlphaSetId to a set of P0-PUSCH-AlphaSet for active UL BWP b of carrier f of spatial setting p.

For $a_{b,f,p}(j)$, where j∈$S_j$, a set of $a_{b,f,p}(j)$ values are provided by a set of alpha in P0-PUSCH-AlphaSet indicated by a respective set of p0-PUSCH-AlphaSetId for active UL BWP b of carrier f of spatial setting p. If (i) the UE is provided SRI-PUSCH-PowerControl, (ii) more than one values of p0-PUSCH-AlphaSetId, and (iii) if a DCI format scheduling the PUSCH transmission includes a SRI field, then the UE obtains a mapping from sri-PUSCH-PowerControlId in SRI-PUSCH-PowerControl between a set of values for the SRI field in the DCI format and a set of indexes provided by p0-PUSCH-AlphaSetId that map to a set of P0-PUSCH-AlphaSet values and determines the values of $a_{b,f,p}(j)$ from the p0-PUSCH-AlphaSetId value that is mapped to the SRI field value. If the PUSCH transmission is scheduled by a DCI format that does not include a SRI field, or if SRI-PUSCH-PowerControl is not provided to the UE, j=2, and the UE determines $a_{b,f,p}(j)$ from the value of the first P0-PUSCH-AlphaSet in p0-AlphaSets.

$M_{RB,b,f}(i)$ is the bandwidth of the PUSCH resource assignment expressed in number of resource blocks for PUSCH transmission occasion i on active UL BWP b of carrier f.

Embodiments of the present disclosure also describe path loss. Path loss is described in the following examples.

For example, a UE (such as the UE 116) can use reference signals that are transmitted and received with a first spatial setting to estimate a path loss for an active DL BWP of carrier f and spatial setting p, wherein the first spatial setting can be same as or different than the spatial setting p.

In the following examples, $PL_{b,f,p}$ is a downlink pathloss estimate in dB calculated by the UE using reference signal (RS) index $q_d$ for the active DL BWP, of carrier f and spatial setting p of a serving cell c.

For the determination of path loss, if the UE is not provided PUSCH-PathlossReferenceRS and enableDefaultBeamPlForSRS for a spatial setting p, or before the UE is provided dedicated higher layer parameters, the UE calculates using a RS resource from an SS/PBCH block with same SS/PBCH block index as the one the UE uses to obtain MIB.

Then, if the UE is configured with a number of RS resource indexes, up to the value of maxNrofPUSCH-PathlossReferenceRSs, and a respective set of RS configurations for the number of RS resource indexes by PUSCH-PathlossReferenceRS, the set of RS resource indexes can include one or both of a set of SS/PBCH block indexes, each provided by ssb-Index when a value of a corresponding pusch-PathlossReferenceRS-Id maps to a SS/PBCH block index, and a set of CSI-RS resource indexes, each provided by csi-RS-Index when a value of a corresponding pusch-PathlossReferenceRS-Id maps to a CSI-RS resource index. The UE identifies a RS resource index $q_d$ in the set of RS resource indexes to correspond either to a SS/PBCH block index or to a CSI-RS resource index as provided by pusch-PathlossReferenceRS-Id in PUSCH-PathlossReferenceRS.

If the UE is provided SRI-PUSCH-PowerControl and more than one values of PUSCH-PathlossReferenceRS-Id, then the UE obtains a mapping from sri-PUSCH-PowerControlId in SRI-PUSCH-PowerControl between a set of values for the SRI field in a DCI format scheduling the PUSCH transmission and a set of PUSCH-PathlossReferenceRS-Id values. The UE also determines the RS resource index $q_d$ from the value of PUSCH-PathlossReferenceRS-Id that is mapped to the SRI field value where the RS resource associated to a spatial setting p is either on serving cell c or, if provided, on a serving cell indicated by a value of pathlossReferenceLinking.

If the PUSCH transmission is scheduled by a DCI format 0_0, and if the UE is provided a spatial setting by PUCCH-SpatialRelationInfo for a PUCCH resource with a lowest index for active UL BWP b of each carrier f and spatial setting p, then the UE uses the same RS resource index $q_d$ as for a PUCCH transmission in the PUCCH resource with the lowest index.

If the PUSCH transmission is scheduled by a DCI format 0_1, and if the UE is provided enableDefaultBeamPlForSRS and is not provided PUSCH-PathlossReferenceRS and PUSCH-PathlossReferenceRS-r16, then the UE uses the same RS resource index $q_d$ as for a SRS resource set with an SRS resource associated with the PUSCH transmission.

If (i) the PUSCH transmission is scheduled by a DCI format 0_0 and the UE is not provided a spatial setting for a PUCCH transmission, (ii) the PUSCH transmission is scheduled by a DCI format 0_1 or DCI format 0_2 that does not include an SRI field, or (iii) SRI-PUSCH-PowerControl is not provided to the UE, then the UE determines a RS resource index $q_d$ with a respective PUSCH-PathlossReferenceRS-Id value being equal to zero where the RS resource is associated to a spatial setting p and is either on serving cell c or, if provided, on a serving cell indicated by a value of pathlossReferenceLinking.

If (i) the PUSCH transmission is scheduled by a DCI format 0_0 on serving cell c, (ii) the UE is not provided PUCCH resources for the active UL BWP of serving cell c, (iii) the UE is provided enableDefaultBeamPlForPUSCH0_0, then the UE determines a RS resource index $q_d$ providing a periodic RS resource associated to a spatial setting p with 'QCL-TypeD' in the TCI state or the QCL assumption of a CORESET with the lowest index in the active DL BWP of the serving cell c.

If (i) the PUSCH transmission is scheduled by a DCI format 0_0 on serving cell c, (ii) the UE is not provided a spatial setting for PUCCH resources on the active UL BWP of the primary cell, and (iii) the UE is provided enableDefaultBeamPlForPUSCH0_0, then the UE determines a RS resource index $q_d$ providing a periodic RS resource associated to a spatial setting p with 'QCL-TypeD' in the TCI state or the QCL assumption of a CORESET with the lowest index in the active DL BWP of serving cell c.

For a PUSCH transmission configured by ConfiguredGrantConfig, if rrc-ConfiguredUplinkGrant is included in ConfiguredGrantConfig, a RS resource index $q_d$ is provided by a value of pathlossReferenceIndex included in rrc-ConfiguredUplinkGrant. In this example, the RS resource is associated to a spatial setting p and is either on serving cell c or, if provided, on a serving cell indicated by a value of pathlossReferenceLinking.

For a PUSCH transmission configured by ConfiguredGrantConfig that does not include rrc-ConfiguredUplinkGrant, the UE determines a RS resource index $q_d$ from a value of PUSCH-PathlossReferenceRS-Id that is mapped to a SRI field value in a DCI format activating the PUSCH transmission. If the DCI format activating the PUSCH transmission does not include a SRI field, then the UE determines a RS resource index $q_d$ with a respective PUSCH-PathlossReferenceRS-Id value being equal to zero where the RS resource is associated to a spatial setting p and is either on serving cell c or, if provided, on a serving cell indicated by a value of pathlossReferenceLinking.

If the UE is provided enablePL-RS-updateForPUSCH-SRS, a mapping between sri-PUSCH-PowerControlId and PUSCH-PathlossReferenceRS-Id values can be updated by a MAC CE. For a PUSCH transmission scheduled by a DCI format that does not include a SRI field, or for a PUSCH transmission configured by ConfiguredGrantConfig and activated by a DCI format that does not include a SRI field, a RS resource index $q_d$ is determined from the PUSCH-PathlossReferenceRS-Id mapped to sri-PUSCH-PowerControlId=0.

A path loss spatial setting p is determined as $PL_{b,f,p}(q_d)$=referenceSignalPower−higher layer filtered RSRP, where referenceSignalPower is provided by higher layers and RSRP for the reference serving cell and spatial setting p and the higher layer filter configuration provided by QuantityConfig for the reference serving cell. If the UE is not configured periodic CSI-RS reception, referenceSignal-Power is provided by ss-PBCH-BlockPower. If the UE is configured periodic CSI-RS reception, referenceSignal-Power is provided either by ss-PBCH-BlockPower or by powerControlOffsetSS providing an offset of the CSI-RS transmission power relative to the SS/PBCH block transmission power. If powerControlOffsetSS is not provided to the UE, the UE assumes an offset of 0 dB.

Embodiments of the present disclosure also describe power control offset $\Delta_{b,f,p}(i)$. This is described in the below examples.

Equation (2) describes number of resource elements for calculating power control offset. In Equation, (2), $N_{symb,b,f,p}^{PUSCH}(i)$ is a number of symbols for PUSCH transmission occasion i on active UL BWP b of carrier f of spatial setting p. The expression, $N_{sc,data}^{RB}(i,j)$ is a number of subcarriers excluding DM-RS subcarriers and phase-tracking RS samples in PUSCH symbol j and assuming no segmentation for a nominal repetition in case the PUSCH transmission is with repetition Type B, $0 \leq j \leq N_{symb,b,f,c,p}^{PUSCH}(i)$.

$$N_{RE} = M_{RB,b,f}^{PUSCH}(i) \cdot \tau_{j=0}^{N_{symb,b,f,p}^{PUSCH}(i)-1} N_{sc,data}^{RB}(i,j) \qquad (2)$$

Embodiments of the present disclosure also describe PUSCH power control adjustment state $f_{b,f,p}(i)$, e.g., a CLPC adjustment state. This is described in the below examples and FIG. 18. The following examples describe a PUSCH power control adjustment state $f_{b,f,p}(i,l)$ for active UL BWP b of carrier f of spatial setting p in PUSCH transmission occasion i.

The expression $\delta_{PUSCH,b,f,p}$ is a transmit power control (TPC) command value included in a DCI format that schedules the PUSCH transmission occasion i on active UL BWP b of carrier f of spatial setting p or jointly coded with other TPC commands in a DCI format 2_2 with CRC scrambled by TPC-PUSCH-RNTI. Here, $l \in \{0,1\}$ if the UE is configured with twoPUSCH-PC-AdjustmentStates and l=0 if the UE is not configured with twoPUSCH-PC-AdjustmentStates or if the PUSCH transmission is scheduled by a RAR UL grant. For a PUSCH (re)transmission configured by ConfiguredGrantConfig, the value of $l \in \{0,1\}$ is provided to the UE by powerControlLoopToUse. If the UE is provided SRI-PUSCH-PowerControl, the UE obtains a mapping between a set of values for the SRI field in a DCI format scheduling the PUSCH transmission and the 1 value(s) provided by sri-PUSCH-ClosedLoopIndex and determines the 1 value that is mapped to the SRI field value. If the PUSCH transmission is scheduled by a DCI format that does not include an SRI field, or if an SRI-PUSCH-PowerControl is not provided to the UE, l=0. If the UE obtains one TPC command from a DCI format 2_2 with CRC scrambled by a TPC-PUSCH-RNTI, the l value is provided by the closed loop indicator field in DCI format 2_2.

Equation (3) describes the PUSCH power control adjustment state l for active UL BWP b of carrier f of spatial setting p and PUSCH transmission occasion i if the UE is not provided tpc-Accumulation. In Equation (3), $\delta_{PUSCH,b,f,p}$ values are from Table 7.1.1-1 in 3GPP TS 38.213 v16.6.0, "NR; Physical layer procedures for control", and $\Sigma_{m=0}^{C(D_i)-1} \delta_{PUSCH,b,f,p}(m,l)$ is a sum of TPC command values in a set $D_i$ of TPC command values with cardinality $C(D_i)$ that the UE receives between $K_{PUSCH}(i-i_0)-1$ symbols before PUSCH transmission occasion $i-i_0$ and $K_{PUSCH}(i)$ symbols before PUSCH transmission occasion i on active UL BWP b of carrier bf of spatial setting p for PUSCH power control adjustment state l, where $i_0 > 0$ is the smallest integer for which $K_{PUSCH}(i-i_0)$ symbols before PUSCH transmission occasion $i-i_0$ is earlier than $K_{PUSCH}(i)$ symbols before PUSCH transmission occasion i.

$$f_{b,f,p}(i,l) = f_{b,f,p}(i-i_0,l) + \Sigma_{m=0}^{C(D_i)-1} \delta_{PUSCH,b,f,p}(m,l) \qquad (3)$$

Regarding Equation (3), if a PUSCH transmission is scheduled by a DCI format, $K_{PUSCH}(i)$ is a number of symbols for active UL BWP b of carrier f of spatial setting p after a last symbol of a corresponding PDCCH reception and before a first symbol of the PUSCH transmission. If a PUSCH transmission is configured by ConfiguredGrantConfig, $K_{PUSCH}(i)$ is a number of $K_{PUSCH,min}$ symbols equal to the product of a number of symbols per slot, $N_{symb}^{slot}$, and the minimum of the values provided by k2 in PUSCH-ConfigCommon for active UL BWP b of carrier f of spatial setting p. If the UE has reached maximum power for active UL BWP b of carrier f of spatial setting p at PUSCH transmission occasion $i-i_0$ and $\Sigma_{m=0}^{C(D_i)-1} \delta_{PUSCH,b,f,p}(m,l) \geq 0$, then $f_{b,f,p}(i,l)=f_{b,f,p}(i-i_0,l)$. If UE has reached minimum power for active UL BWP b of carrier f of spatial setting p at PUSCH transmission occasion $i-i_0$ and $\Sigma_{m=0}^{C(D_i)-1} \delta_{PUSCH,b,f,p}(m,l) \leq 0$, then $f_{b,f,p}(i,l)=f_{b,f,p}(i-i_0,l)$.

If (i) a configuration for a corresponding $P_{O\_UE\_PUSCH,b,f,p}(j)$ value is provided by higher layers or (ii) a configuration for a corresponding $a_{b,f,p}(j)$ value is provided by higher layers, then A UE can reset accumulation of a PUSCH power control adjustment state l for active UL BWP b of carrier f of spatial setting p to $f_{b,f,p}(k,l)=0$, $k=0, 1, \ldots, i$. Here, l is determined from the value of j. For example, if j>1 and the UE is provided higher SRI-PUSCH-PowerControl, l is the sri-PUSCH-ClosedLoopIndex value(s) configured in any SRI-PUSCH-PowerControl with the sri-P0-PUSCH-AlphaSetId value corresponding to j. For another example, if j>1 and the UE is not provided SRI-PUSCH-PowerControl or j=0, l=0. For yet another example, if j=1, l is provided by the value of powerControlLoopToUse.

Equation (4) describes the PUSCH power control adjustment state for active UL BWP b of carrier f of spatial setting p and PUSCH transmission occasion i if the UE is provided tpc-Accumulation.

$$f_{b,f,p}(i,l) = \delta_{PUSCH,b,f,p}(i,l) \qquad (4)$$

Equation (5) describes a PUSCH power control adjustment when the UE receives a random access response message in response to a PRACH transmission or a MsgA transmission on active UL BWP b of carrier f of spatial setting p. In Equation (5), l=0 and $\delta_{msg2,b,f,p}$ is a TPC command value indicated in a random access response grant of the random access response message corresponding to a PRACH transmission according to Type-1 random access procedure, or in a random access response grant of the random access response message corresponding to a MsgA transmission according to Type-2 random access procedure with RAR message(s) for fallbackRAR, on active UL BWP b of carrier f in the spatial setting p and Equation (6).

$$f_{b,f,p}(0, l) = \Delta P_{rampup,b,f,p} + \delta_{msg2,b,f,p} \tag{5}$$

$$\Delta P_{rampup,b,f,p} = \min\left[\left\{\max\left(0, P_{CMAX,f,p} - \left(\begin{array}{c}10\log_{10}\left(2^\mu \cdot M_{RB,b,f,p}^{PUSCH}(0)\right) + \\ P_{O\_UE\_PUSCH,b,f,p}(0) + \alpha_{b,f,p}(0) \cdot PL_p + \\ \Delta_{TF,b,f,p}(0) + \delta_{msg2,b,f,p}\end{array}\right)\right)\right\}, \Delta P_{rampuprequested,b,f,p}\right] \tag{6}$$

Here, $\Delta P_{rampuprequested,b,f,p}$ is provided by higher layers and corresponds to the total power ramp-up requested by higher layers from the first to the last random access preamble for carrier f in the spatial setting p. The expression $M_{RB,b,f,p}^{PUSCH}(0)$ is the bandwidth of the PUSCH resource assignment expressed in number of resource blocks for the first PUSCH transmission on active UL BWP b of carrier f of spatial setting p. The expression $\Delta_{TF,b,f,p}(0)$ is the power adjustment of first PUSCH transmission on active UL BWP b of carrier f of spatial setting p.

Figure 18:
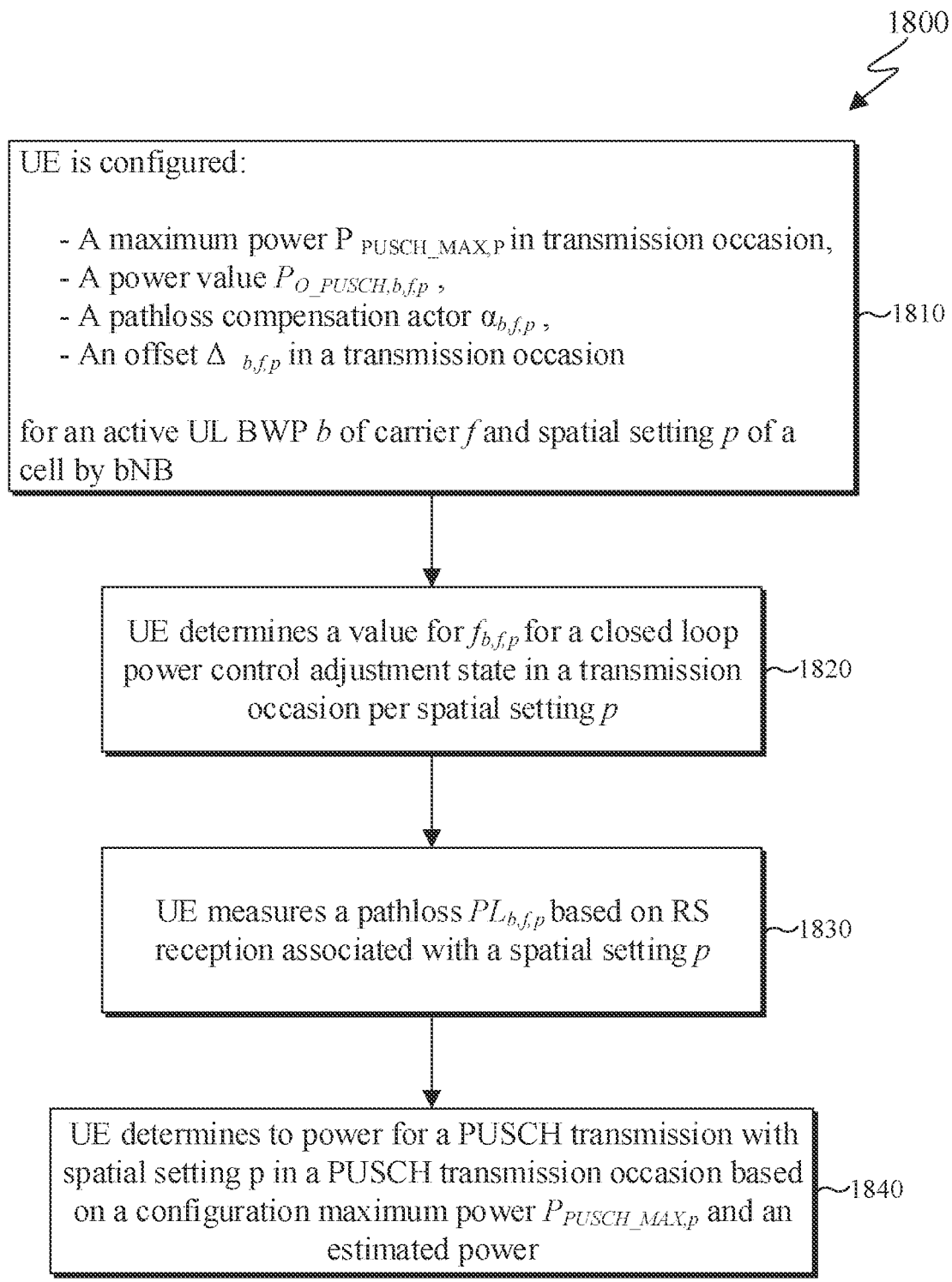
FIG. 18 illustrates an example method for a UE determining a power $P_{PUSCH,p}(i)$ for a PUSCH transmission with spatial setting p in a PUSCH transmission occasion according to embodiments of present disclosure.

If the UE transmits the PUSCH in PUSCH transmission occasion i on active UL BWP b of carrier f and spatial setting p, $f_{b,f,p}(0,l)=\Delta P_{rampup,b,f,p}$ where l=0, and $\Delta P_{rampup,b,f,p}$ is described in Equation (7). It is noted that $\Delta P_{rampuprequested,b,f,p}$, as described in Equation (7), is provided by higher layers and corresponds to the total power ramp-up requested by higher layers $M_{RB,b,f,p}^{PUSCH}(i)$ is the bandwidth of the PUSCH resource assignment expressed in number of resource blocks, and $\Delta_{TF,b,f,p}(i)$ is the power adjustment of the PUSCH transmission in PUSCH transmission occasion i.

sponding TPC commands in a DCI format, wherein the DCI format can be a DCI format scheduling the PUSCH transmission or a DCI format 2_2 as previously described. In step 1830, the UE measures a pathloss $PL_{b,f,p}$ based on RS reception associated with spatial setting p. In step 1840, the UE determines a power for a PUSCH transmission with spatial setting p in a transmission occasion i based on a configured maximum power $P_{PUSCH\_MAX,p}$ and an estimated power wherein the estimated power consists of multiple components Although FIG. 18 illustrates the method 1800 various changes may be made to FIG. 18. For example, while the method 1800 of FIG. 18 is shown as a series of steps, various steps could overlap, occur in parallel, occur in a different order, or occur multiple times. In another example, steps may be omitted or replaced by other steps. For example, steps of the method 1800 can be executed in a different order.

Embodiments of the present disclosure also describe transmit power for PUCCH transmissions with different spatial settings in different cells or carriers. This is described in the below examples and FIG. 19.

In certain embodiments, when a UE is provided or determines spatial settings for transmissions with multiple spatial settings, the UE determines a power for a PUCCH transmission in PUCCH transmission occasion i on active UL BWP b of carrier f and spatial setting p in a primary cell c using PUCCH power control adjustment state with index l as a minimum value between a configured maximum power for spatial setting p in PUCCH transmission occasion i, $P_{CMAX,f,p}(i)$ and a power, as described in Equation (8).

$$P_{PUCCH,b,f,p}(i,q_u,q_{d},l)=P_{O_{PUCCH},b,f,p}(q_u)+10 \log_{10}(2^\mu \cdot M_{RB,b,f}^{PUCCH}(i))+PL_{b,f,p}(q_d)+\Delta_{F\_PUCCH}(F)+\Delta_{TF,b,f,p}(i)+g_{b,f,p}(i,l) \tag{8}$$

$$\Delta P_{rampup,b,f,p} = \min\left[\left\{\max\left(0, P_{CMAX,f,p} - \left(\begin{array}{c}10\log_{10}\left(2^\mu \cdot M_{RB,b,f,p}^{PUSCH}(i)\right) + \\ P_{O\_UE\_PUSCH,b,f,p}(0) + \alpha_{b,f,p}(0) \cdot PL_p(i) + \\ \Delta_{TF,b,f,p}(i)\end{array}\right)\right)\right\}, \Delta P_{rampuprequested,b,f,p}\right] \tag{7}$$

FIG. 18 illustrates an example method 1800 for a UE determining a power $P_{PUSCH,p}(i)$ for a PUSCH transmission with spatial setting p in a PUSCH transmission occasion according to embodiments of present disclosure. The steps of the method 1800 can be performed by any of the UEs 111-116 of FIG. 1, such as the UE 116 of FIG. 3. The method 1800 of FIG. 18 is for illustration only and other embodiments can be used without departing from the scope of the present disclosure.

In step 1810, a UE (such as the UE 116) is configured a maximum power $P_{PUSCH\_MAX,p}$ in a transmission occasion, a power value $P_{O\_PUSCH,b,f,p}$, a pathloss compensation factor $\alpha_{b,f,p}$ and an offset $\Delta_{b,f,p}$ in a transmission occasion, for an active UL BWP b of carrier f and spatial setting p of a serving cell by gNB. In step 1820, the UE determines a value for a closed loop power control adjustment state $f_{b,f,p}$ for the transmission occasion per spatial setting p based on corre- $P_{CMAX,f,p}(i)$ is the UE configured maximum output power for carrier f of spatial setting p of a primary cell c in PUCCH transmission occasion i. In Equation, (8) $P_{O\_PUCCH,b,f,p}$ is a power value configured by a gNB per spatial setting p. $M_{RB,b,f}$ is the bandwidth of the PUSCH resource assignment, μ is a SCS configuration. $PL_{b,f,p}$ is a path-loss level measured by a UE based on RS reception associated with spatial setting p. $\Delta_{F\_PUCCH}(F)$ is a factor depending on the PUCCH format, if provided. $\Delta_{TF,b,f,p}(i)$ is a weighting factor representing a compensation for the path loss configured by gNB and can be provided separately per spatial setting p. $g_{b,f,p}(i,l)$ is a transmission power control value in the transmission occasion i and can be maintained per spatial setting p.

The expression, $P_{O\_PUCCH,b,f,p}(q_u)$ is a parameter composed of the sum of a component $P_{O\_NOMINAL\_PUCCH}$, provided by p0-nominal, or $P_{O\_NOMINAL\_PUCCH}=0$ dBm if p0-nominal is not provided, for carrier f of spatial setting p and, if provided, a component $P_{O\_UE\_PUCCH}(q_u)$ provided by p0-PUCCH-Value in P0-PUCCH for active UL BWP b of carrier f of spatial setting p, where $0 \leq q_u < Q_u \cdot Q_u$ is a size for a set of $P_{O\_UE\_PUCCH}$ values provided by maxNrofPUCCH-P0-PerSet. The set of $P_{O\_UE\_PUCCH}$ values is provided by p0-Set. If p0-Set is not provided to the UE, $P_{O\_UE\_PUCCH}(q_u)=0$, $0 \leq q_u < Q_u$.

In Equation (8), $M_{RB,b,f}^{PUCCH}(i)$ is a bandwidth of the PUCCH resource assignment expressed in number of resource blocks for PUCCH transmission occasion i on active UL BWP b of carrier f of a primary cell and μ is a SCS configuration.

Additionally, in Equation (8), $PL_{b,f,p}(q_d)$ is a downlink pathloss estimate in dB calculated by the UE using RS resource index $q_d$ for the active DL BWP b of carrier f of the spatial setting p.

If the UE is not provided pathlossReferenceRSs or before the UE is provided dedicated higher layer parameters, the UE calculates $PL_{b,f,p}(q_d)$ using a RS resource obtained from an SS/PBCH block with same SS/PBCH block index as the one the UE uses to obtain MIB.

The parameter $\Delta_{F\_PUCCH}(F)$, of Equation (8), is a value of deltaF-PUCCH-f0 for PUCCH format 0, deltaF-PUCCH-f1 for PUCCH format 1, deltaF-PUCCH-f2 for PUCCH format 2, deltaF-PUCCH-f3 for PUCCH format 3, and deltaF-PUCCH-f4 for PUCCH format 4, if provided; otherwise $\Delta_{F\_PUCCH}(F)=0$.

The parameter $\Delta_{TF,b,f,p}(i)$, of Equation (8), is a PUCCH transmission power adjustment component on active UL BWP b of carrier f of a spatial setting p. It is noted that for a PUCCH transmission using PUCCH format 0 or PUCCH format 1, $\Delta_{TF,b,f,p}(i)$, is described in Equation (9), below.

$$\Delta_{TF,b,f,p}(i) = 10\log_{10}\left(\frac{N_{ref}^{PUCCH}}{N_{symb}^{PUCCH}(i)}\right) + \Delta_{UCI}(i) \quad (9)$$

Here, $N_{symb}^{PUCCH}(i)$ is a number of PUCCH format 0 symbols or PUCCH format 1 symbols for the PUCCH transmission. It is noted that $N_{ref}^{PUCCH}=2$ for PUCCH format 0. $N_{ref}^{PUCCH}=N_{symb}^{slot}$ for PUCCH format 1. $\Delta_{UCI}(i)=0$ for PUCCH format 0, otherwise $\Delta_{UCI}(i)=10\log_{10}(O_{UCI}(i))$ for PUCCH format 1, where $O_{UCI}(i)$ is a number of UCI bits in PUCCH transmission occasion i.

For a PUCCH transmission using PUCCH format 2 or PUCCH format 3 or PUCCH format 4 and for a number of UCI bits smaller than or equal to 11, then, $\Delta_{TF,b,f,p}(i)$, is described in Equation (10), below. As described in Equation (10), $K_1=6$. The parameter $n_{HARQ-ACK}$ is a number of HARQ-ACK information bits that the UE determines for Type-1 HARQ-ACK codebook and for Type-2 HARQ-ACK codebook. If the UE is not provided with pdsch-HARQ-ACK-Codebook, $n_{HARQ-ACK}(i)=1$. If the UE includes a HARQ-ACK information bit in the PUCCH transmission; otherwise, $n_{HARQ-ACK}(i)=0$. The parameter $O_{SR}(i)$ is a number of SR information bits that the UE determines. The parameter $O_{CSI}(i)$ is a number of CSI information bits that the UE determines. The parameter $N_{RE}$ is a number of resource elements based on Equation (11).

$$\Delta_{TF,b,f,p}(i)=10\log_{10}(K_1(n_{HARQ-ACK}(i)+O_{SR}(i)+O_{CSI}(i))/N_{RE}(i)) \quad (10)$$

$$N_{RE}(i)=M_{RB,b,f,p}^{PUCCH}(i) \cdot N_{sc,control}^{RB}(i) \cdot N_{symb-UCI,b,f,p}^{PUCCH}(i) \quad (11)$$

Here, $N_{sc,control}^{RB}(i)$ is a number of subcarriers per resource block excluding subcarriers used for DM-RS transmission, and $N_{symb-UCI,b,f,p}^{PUCCH}(i)$ is a number of symbols excluding symbols used for DM-RS transmission, for PUCCH transmission occasion i on active UL BWP b of carrier f of spatial setting p.

For a PUCCH transmission using PUCCH format 2 or PUCCH format 3 or PUCCH format 4 and for a number of UCI bits larger than 11 then, $\Delta_{TF,b,f,p}(i)$, is described in Equation (12), below. As described in Equation (12), $K_1=24$. The parameter BPRE(i) is described in Equation (13).

$$\Delta_{TF,b,f,p}(i)=10\log_{10}(2^{K_2 \cdot BPRE(i)}-1) \quad (12)$$

$$BPRE(i)=(O_{ACK}(i)+O_{SR}(i)+O_{CSI}(i)+O_{CRC}(i)/N_{RE}(i)) \quad (13)$$

As described in Equation (13), $O_{ACK}(i)$ is a number of HARQ-ACK information bits that the UE determines for Type-1 HARQ-ACK codebook and for Type-2 HARQ-ACK codebook. If the UE is not provided pdsch-HARQ-ACK-Codebook, $O_{ACK}(i)=1$ if the UE includes a HARQ-ACK information bit in the PUCCH transmission; otherwise, $O_{ACK}(i)=0$. The parameter $O_{SR}(i)$ is a number of SR information bits. The parameter $O_{CSI}(i)$ is a number of CSI information bits. The parameter $O_{CRC}(i)$ is a number of CRC bits. The parameter $N_{RE}(i)$ is a number of resource elements that the UE determines based on Equation (14).

$$N_{RE}(i)=M_{RB,b,f,p}^{PUCCH}(i) \cdot N_{sc,control}^{RB}(i) \cdot N_{symb-UCI,b,f,p}^{PUCCH}(i) \quad (14)$$

Here, $N_{sc,control}^{RB}(i)$ is a number of subcarriers per resource block excluding subcarriers used for DM-RS transmission, and $N_{symb-UCI,b,f,p}^{PUCCH}(i)$ is a number of symbols excluding symbols used for DM-RS transmission, for PUCCH transmission occasion i on active UL BWP b of carrier f of spatial setting p.

For the PUCCH power control adjustment state $g_{b,f,p}(i,l)$ for active UL BWP b of carrier f of spatial setting p and PUCCH transmission occasion i, $\delta_{PUCCH,b,f,p}(i,l)$ is a TPC command value and is included in a DCI format 1_0 or DCI format 1_1 for active UL BWP b of carrier f of the spatial setting p that the UE detects for PUCCH transmission occasion i or is jointly coded with other TPC commands in a DCI format 2_2 with CRC scrambled by TPC-PUCCH-RNTI. Here, $l \in \{0,1\}$ if the UE is provided twoPUCCH-PC-AdjustmentStates and PUCCH-SpatialRelationInfo and l=0 if the UE is not provided twoPUCCH-PC-AdjustmentStates or PUCCH-SpatialRelationInfo.

Equation (15) describes power control adjustment state $g_{b,f,p}(i,l)$ for the current PUCCH power control adjustment state l for active UL BWP b of carrier f of a spatial setting p and PUCCH transmission occasion i.

$$g_{b,f,p}(i,l)=g_{b,f,p}(i-i_0,l)+\Sigma_{m=0}^{C(C_i)-1}\delta_{PUCCH,b,f,p}(m,l) \quad (15)$$

Here, the $\delta_{PUCCH,b,f,p}$ values are predetermined based on a mapping with power control commands. The expression, $\Sigma_{m=0}^{C(C_i)-1}\delta_{PUCCH,b,f,p}(m,l)$ is a sum of TPC command values in a set $C_i$ of TPC command values with cardinality $C(C_i)$ that the UE receives between $K_{PUCCH}(i-i_0)-1$ symbols before PUCCH transmission occasion $i-i_0$ and $K_{PUCCH(i)}$ symbols before PUCCH transmission occasion i on active UL BWP b of carrier f of a spatial setting p for PUCCH power control adjustment state, where $i_0>0$ is the smallest integer for which $K_{PUCCH}(i-i_0)$ symbols before PUCCH transmission occasion $i-i_0$ is earlier than $K_{PUCCH}(i)$ symbols before PUCCH transmission occasion i.

If the PUCCH transmission is in response to a detection by the UE of a DCI format 1_0 or DCI format 1_1, $K_{PUCCH(i)}$ is a number of symbols for active UL BWP b of carrier f of a spatial setting p after a last symbol of a corresponding PDCCH reception and before a first symbol of the PUCCH transmission.

If the PUCCH transmission is not in response to a detection by the UE of a DCI format 1_0 or DCI format 1_1, $K_{PUCCH(i)}$ is a number of $K_{PUCCH,min}$ symbols equal to the product of a number of symbols per slot, $n_{symb}^{slot}$, and the minimum of the values provided by k2 in PUSCH-Config-Common for active UL BWP b of carrier f of spatial setting p.

If the UE has reached maximum power for active UL BWP b of carrier f of spatial setting p at PUCCH transmission occasion $i-i_0$ and $\Sigma_{m=0}^{C(C_i)-1}\delta_{PUCCH,b,f,p}(m,l) \geq 0$, then $g_{b,f,p}(i,l)=g_{b,f,p}(i-i_0,l)$.

If UE has reached minimum power for active UL BWP b of carrier f of spatial setting p at PUCCH transmission occasion $i-i_0$ and $\Sigma_{m=0}^{C(C_i)-1}\delta_{PUCCH,b,f,p}(m,l) \leq 0$, then $g_{b,f,p}(i,l)=g_{b,f,p}(i-i_0,l)$.

If a configuration of a $P_{O\_PUCCH,b,f,p}(q_u)$ value for a corresponding PUCCH power control adjustment state 1 for active UL BWP b of carrier f of spatial setting p is provided by higher layers, then $g_{b,f,p}(k,l)=0$, k=0, 1, . . . , i. If the UE is provided PUCCH-SpatialRelationInfo, the UE determines the value of 1 from the value of $q_u$ based on a pucch-SpatialRelationInfoId value associated with the p0-PUCCH-Id value corresponding to $q_u$ and with the closedLoopIndex value corresponding to 1; otherwise, l=0.

Otherwise Equation (16) describes power control adjustment state $g_{b,f,p}(i,l)$. The parameter k is set to zero.

$$g_{b,f,p}(0,l) = \Delta P_{rampup,b,f,p} + \delta_{b,f,c} \quad (16)$$

The parameter $\delta_{b,f,c}$ is the TPC command value indicated in a random access response grant corresponding to a PRACH transmission according to Type-1 random access procedure, or in a random access response grant corresponding to MsgA transmissions according to Type-2 random access procedure with RAR message(s) for fallbackRAR. Otherwise the parameter $\delta_{b,f,c}$ is the TPC command value indicated in a success RAR corresponding to MsgA transmissions for Type-2 random access procedure. Otherwise, parameter $\delta_{b,f,c}$ is the TPC command value in a DCI format with CRC scrambled by C-RNTI or MCS-C-RNTI that the UE detects in a first PDCCH reception in a search space set provided by recoverySearchSpaceId if the PUCCH transmission is a first PUCCH transmission after 28 symbols from a last symbol of the first PDCCH reception.

If the UE transmits PUCCH on active UL BWP b of carrier f of spatial setting p, then $\Delta P_{rampup,b,f,p}$, of Equation (16), is described in Equation (17), otherwise it is described in Equation (18). The parameter, $\Delta P_{rampuprequested,b,f,c}$ is provided by higher layers and corresponds to the total power ramp-up requested by higher layers from the first to the last preamble for active UL BWP b of carrier f of spatial setting p. The parameter $\Delta_{F\_PUCCH}(F)$ corresponds to PUCCH format 0 or PUCCH format 1.

Figure 19:
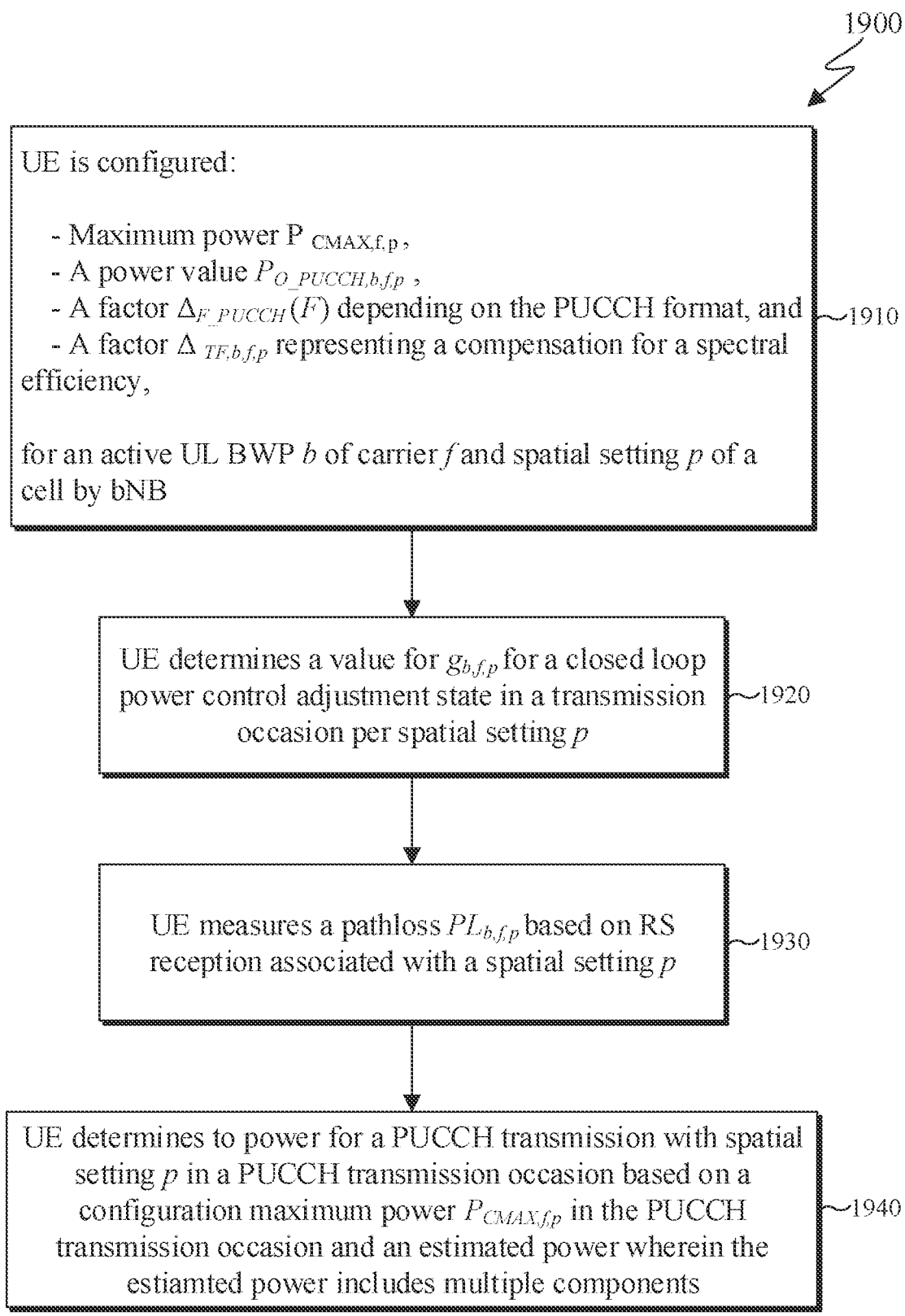
FIG. 19 illustrates an example method for a UE determining a power $P_{PUCCH,p}(i)$ for a PUCCH transmission with spatial setting p in a PUCCH transmission occasion i according to embodiments of present disclosure.

FIG. 19 illustrates an example method 1900 for a UE determining a power $P_{PUCCH,p}(i)$ for a PUCCH transmission with spatial setting p in a PUCCH transmission occasion i according to embodiments of present disclosure. The steps of the method 1900 can be performed by any of the UEs 111-116 of FIG. 1, such as the UE 116 of FIG. 3. The method 1900 of FIG. 19 is for illustration only and other embodiments can be used without departing from the scope of the present disclosure.

In step 1910, a UE is configured a power value $P_{O\_PUCCH,b,f,p}$, a power adjustment factor $\Delta_{F\_PUCCH}(F)$ depending on the PUCCH format, and a factor $\Delta_{TF,b,f,p}(i)$ representing a compensation for a spectral efficiency of the PUCCH transmission in an active UL BWP b of carrier f and spatial setting p of a serving cell by gNB. In step 1920, the UE determines a value of a closed loop power adjustment state $g_{b,f,p}$ in a transmission occasion per spatial setting p. In step 1930, the UE measures a pathloss $PL_{b,f,p}$ based on RS reception associated with spatial setting p. In step 1940, the UE determines a power for the PUCCH transmission with spatial setting p in a PUCCH transmission occasion i based on a configured maximum power $P_{CMAX,f,p}$ in the PUCCH transmission occasion and an estimated power wherein the estimated power consists of multiple components.

Although FIG. 19 illustrates the method 1900 various changes may be made to FIG. 19. For example, while the method 1900 of FIG. 19 is shown as a series of steps, various steps could overlap, occur in parallel, occur in a different order, or occur multiple times. In another example, steps may be omitted or replaced by other steps. For example, steps of the method 1900 can be executed in a different order.

Embodiments of the present disclosure also describe transmissions with repetitions. This is described in the below examples.

In the following embodiments, a UE (such as the UE 116) is configured with PUSCH repetition type A refers to the transmission of a single repetition in a slot, wherein all symbols of a repetition are within a slot duration, subsequent repetitions are transmitted in subsequent slots, and transmission in a slot can be omitted. A UE configured with PUSCH repetition type B includes cases when the UE can transmit more than one repetitions in a slot, a repetition can be over more than one slot, and different repetitions can be over different numbers of symbols. If a UE does not transmit a PUSCH with repetitions, the UE is considered to transmit only one/first repetition for the PUSCH transmission. Further, a UE is assumed to not be capable to simultaneously transmit with different spatial settings. Embodiments for determining prioritizations for transmissions with repetitions herein described for PUSCH also apply to PUCCH transmissions.

In certain embodiments, a UE is configured to transit PUSCH with a first spatial setting on cell 1 and a PUSCH $$\Delta P_{rampup,b,f,p} = \min\left[\left\{\max\left(\begin{array}{c}0,\\P_{CMAX,f,p} - (P_{O\_PUCCH,b,f,p} + PL_{b,f,p}(q_d) + \Delta_{F\_PUCCH}(F) + \Delta_{TF,b,f,p} + \delta_{b,f,p})\end{array}\right)\right\}, \Delta P_{rampuprequested,b,f,p}\right] \quad (17)$$

$$\Delta P_{rampup,b,f,p} = \min\left[\left\{\max\left(\begin{array}{c}0,\\P_{CMAX,f,p} - (P_{O\_PUCCH,b,f,p} + PL_{b,f,p}(q_d))\end{array}\right)\right\}, \Delta P_{rampuprequested,b,f,p}\right] \quad (18)$$

with a second spatial setting on cell 2. This is described in the below examples and FIGS. 20-24.

When a PUSCH transmission is configured with repetitions for transmission on cell 1 and a PUSCH transmission is configured without repetitions on cell 2, on a transmission occasion, a UE prioritizes the transmission configured without repetitions on cell 2.

When a PUSCH transmission is configured with repetitions for transmission on both cell 1 and cell 2, and a UE needs to transmit PUSCH with repetitions on both cell 1 and cell 2 on a transmission occasion, a UE can prioritize various transmissions. For example, the UE can prioritize a transmission of first repetition that can be either a first nominal repetition for type A repetitions or a first actual repetition for type B repetitions. For another example, the UE can prioritize a transmission of a nominal type A repetition if PUSCH repetitions on both cells are first repetitions. For another example, the UE can prioritize a transmission of a repetition for a PUSCH transmission with the smaller repetition number. For another example, the UE can prioritize a transmission of a repetition for a PUSCH transmission with the smaller number of repetitions. For another example, the UE can prioritize a transmission of repetition with a smaller (or larger) number of PUSCH symbols per repetition for type A repetition. For another example, the UE can prioritize a transmission of repetition with a smaller number of PUSCH symbols in a slot. For yet another example, the UE can prioritize a transmission of a repetition with a smaller (or larger) SCS.

Figure 20:
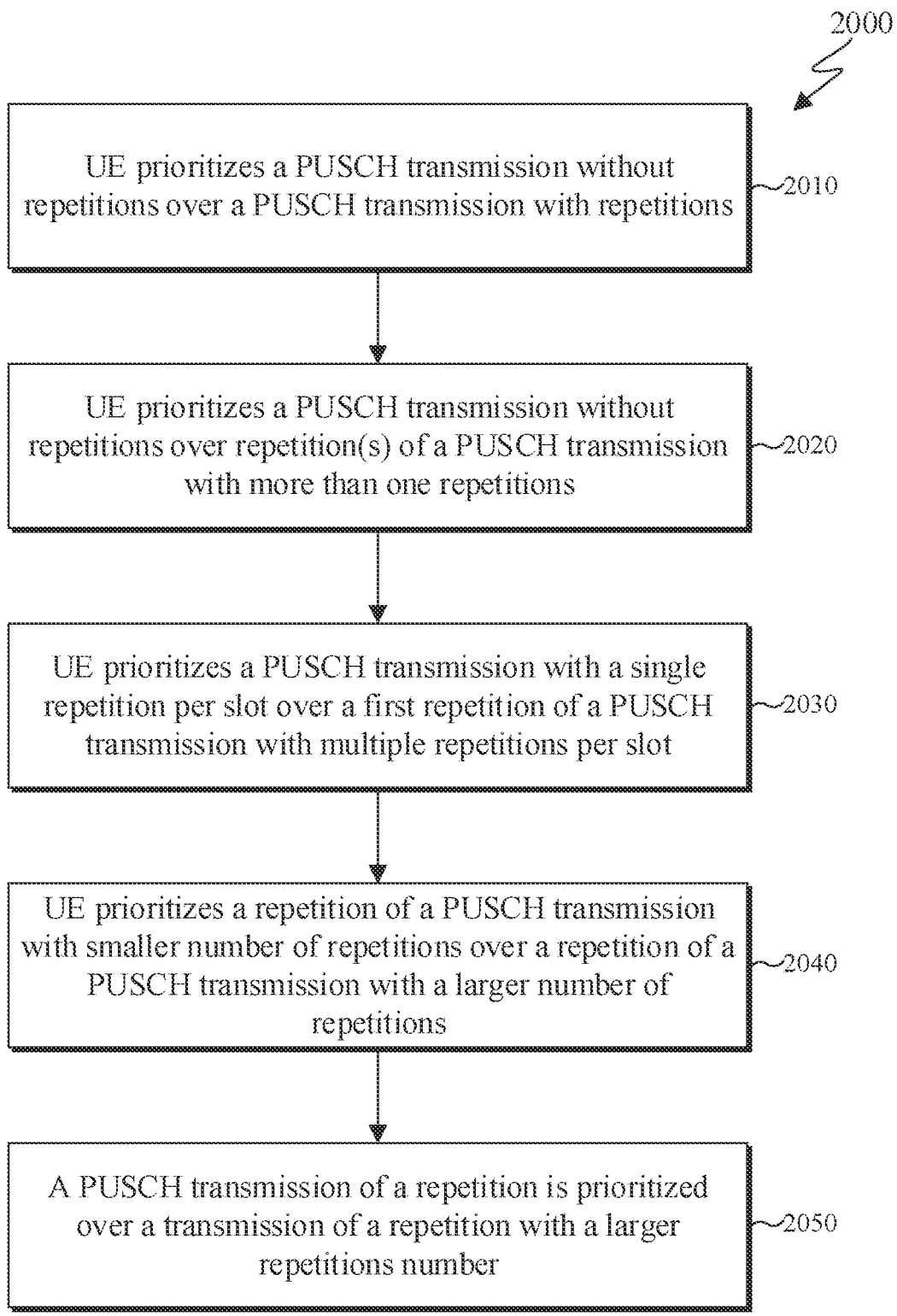
FIG. 20 illustrates an example method for a UE prioritizes a repetition according to embodiments of present disclosure.

A UE can apply above prioritizations and combinations of the above prioritizations in a descending order, as described in FIG. 20.

FIG. 20 illustrates an example method 2000 for a UE prioritizes a repetition according to embodiments of present disclosure. The steps of the method 2000 can be performed by any of the UEs 111-116 of FIG. 1, such as the UE 116 of FIG. 3. The method 2000 of FIG. 20 is for illustration only and other embodiments can be used without departing from the scope of the present disclosure.

In step 2010, a UE (such as the UE 116) can a prioritized a PUSCH or PUCCH transmission configured without repetitions on a first cell is respectively over a PUSCH or PUCCH transmission with repetitions on a second cell. When both transmissions on the first and second cells are with repetitions, other transmission characteristics are considered. The UE prioritizes a first repetition of a PUSCH or PUCCH transmission over a subsequent repetition of a PUSCH or PUCCH transmission (step 2020). A first type A repetition is prioritized over a first type B repetition, or in general, when both repetitions are first repetitions, the transmission of a single repetition per slot is prioritized over the transmission of multiple repetitions per slot (step 2030). The reverse can also be the selected transmission characteristic as multiple repetitions per slot can utilize more symbols that a UE can use to transmit in a slot. When both transmissions are with more than one repetitions, the UE prioritizes a repetition corresponding to the transmission with a smaller number of repetitions (step 2040). When both transmissions are repetitions, a transmission with a smaller repetition number is prioritized (2050).

Although FIG. 20 illustrates the method 2000 various changes may be made to FIG. 20. For example, while the method 2000 of FIG. 20 is shown as a series of steps, various steps could overlap, occur in parallel, occur in a different order, or occur multiple times. In another example, steps may be omitted or replaced by other steps. For example, steps of the method 2000 can be executed in a different order.

FIGS. 21, 22, 23, and 24 illustrate an example signal diagram according to embodiments of present disclosure.

It is also possible that configurations of repetitions and repetition types are used to determine prioritizations for transmission power reductions. Such prioritizations can be used for the entire transmission of a PUSCH transmission with repetition. For example, if a UE transmits a first PUSCH with repetition type A on cell 1 and a second PUSCH with repetition type B on cell 2, the UE can prioritize a repetition of the first PUSCH transmission on cell 1 over a repetition of the second PUSCH transmission on cell 2.

Figure 21:
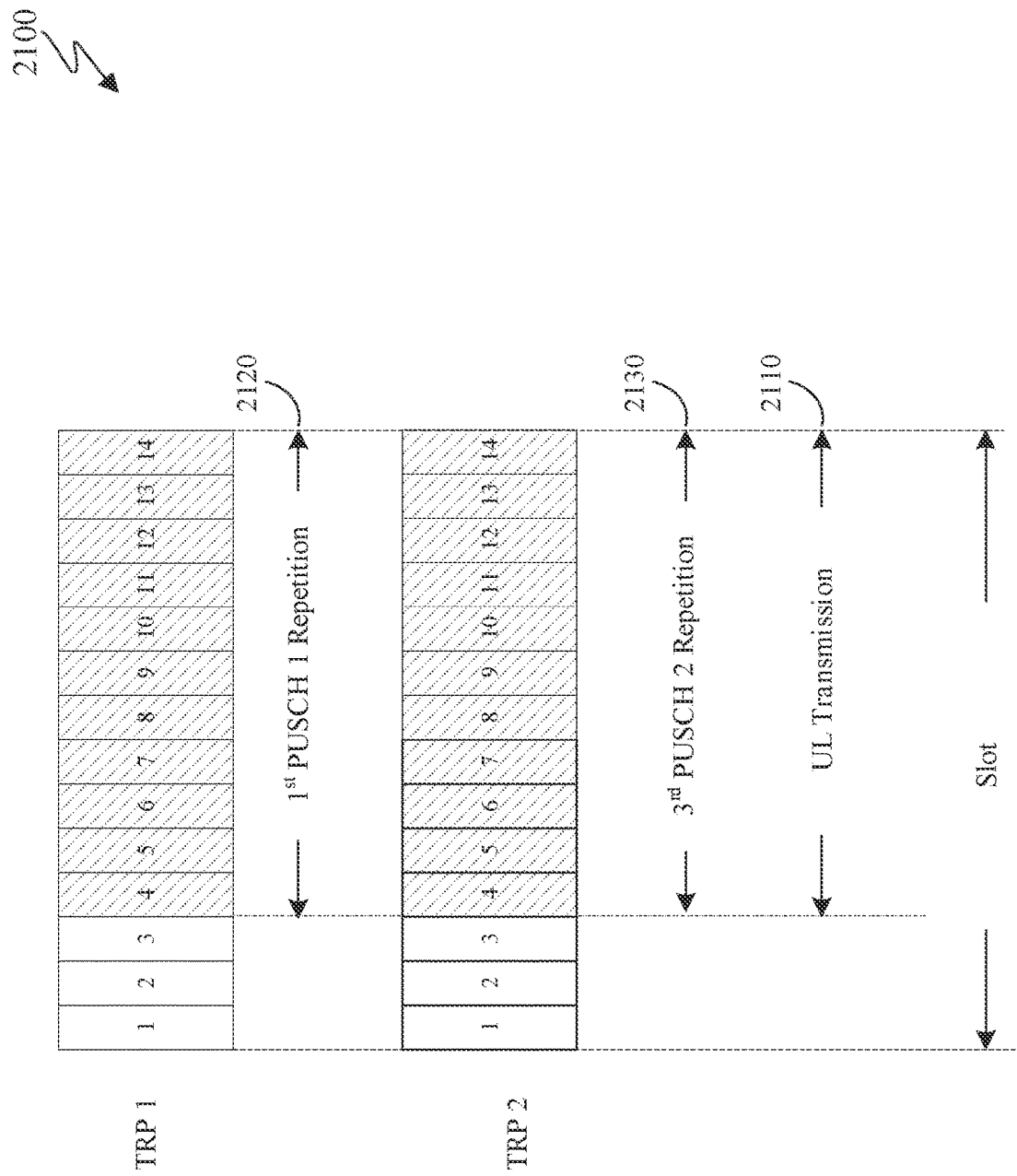
FIGS. 21, 22, 23, and 24 illustrate an example signal diagram according to embodiments of present disclosure

If a UE transmits first and second PUSCHs with type B repetitions on cell 1 and cell 2, respectively, the UE can prioritize a various transmissions. For example, the UE can prioritize a transmission with a first actual repetition. For example, as illustrated in FIG. 21, when a UE transmits a first repetition for the first PUSCH over a slot and a third repetition for the second PUSCH over a same slot, the UE prioritizes the first repetition. In general, prioritization for transmission power reductions applies to a transmission occasion, which in this example corresponds to a group of 11 symbols.

FIG. 21 illustrates signal diagram 2100 where a UE is configured for PUSCH transmission with repetitions on cell 1 (PUSCH1) and on cell 2 (PUSCH2), over symbols 4 to 14 of a slot 2110. The UE transmits a first repetition of length 11 symbols of PUSCH1 on cell 1 2120 and a third repetition of length 11 symbols of PUSCH2 on cell 2 2130.

Figure 22:
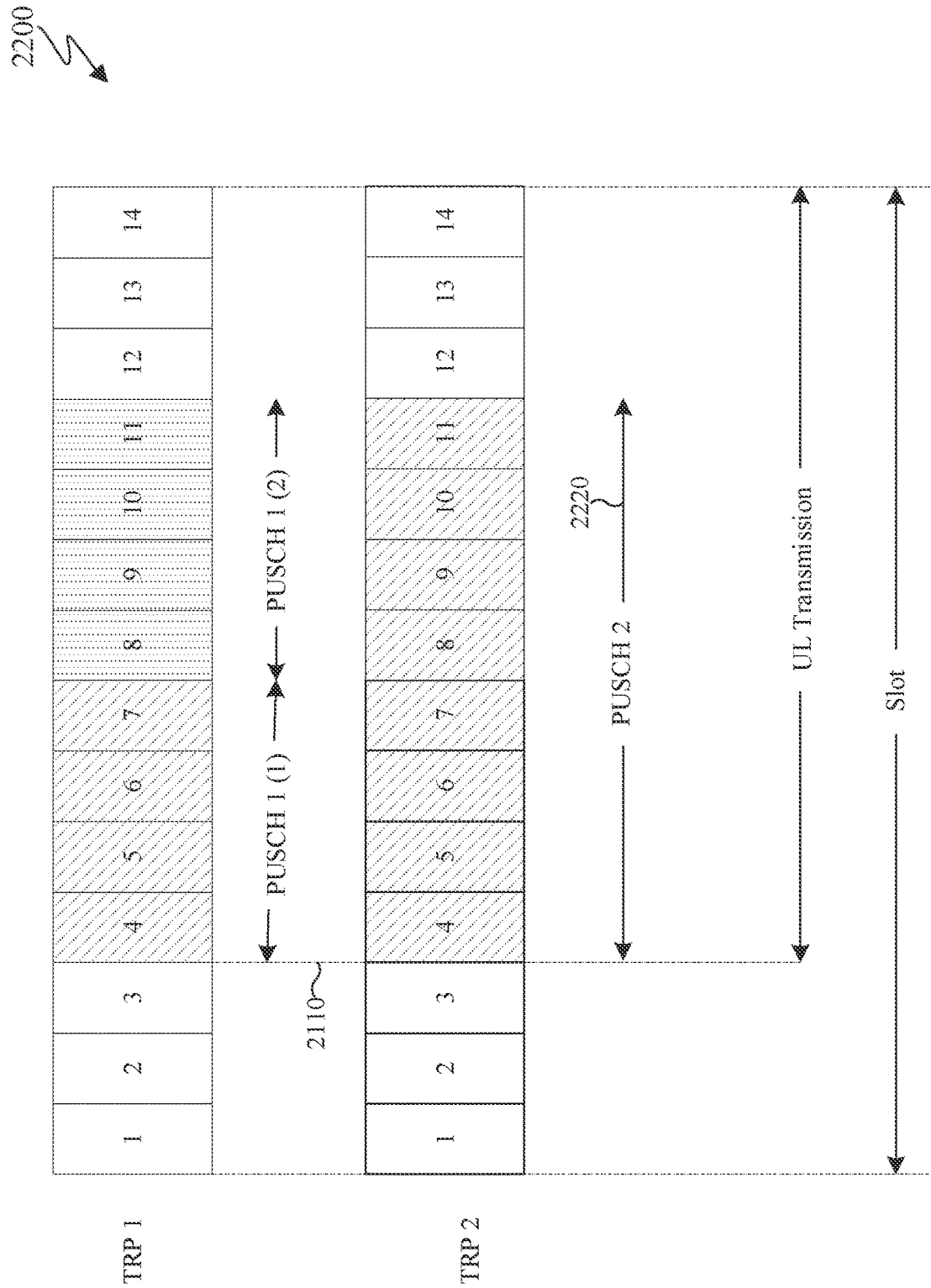

For another example, the UE can prioritize a transmission of a repetition with a smaller number of PUSCH symbols per repetition (for example, as illustrated in FIG. 22, when a UE transmits a first PUSCH with repetitions on cell 1 and the length of a nominal repetition is four symbols and transmits a second PUSCH with repetitions on cell 2 and the length of a nominal repetition is eight symbols, the UE prioritizes transmission of the first PUSCH).

FIG. 22 illustrates signal diagram 2200 where a UE is configured for PUSCH transmission with repetitions on cell 1 (PUSCH1) and on cell 2 (PUSCH2), over symbols 4 to 14 of a slot. The UE transmits a PUSCH repetition of length 4 symbols on cell 1 2210 and a PUSCH repetition of length 8 symbols on cell 2 2220

Figure 23:
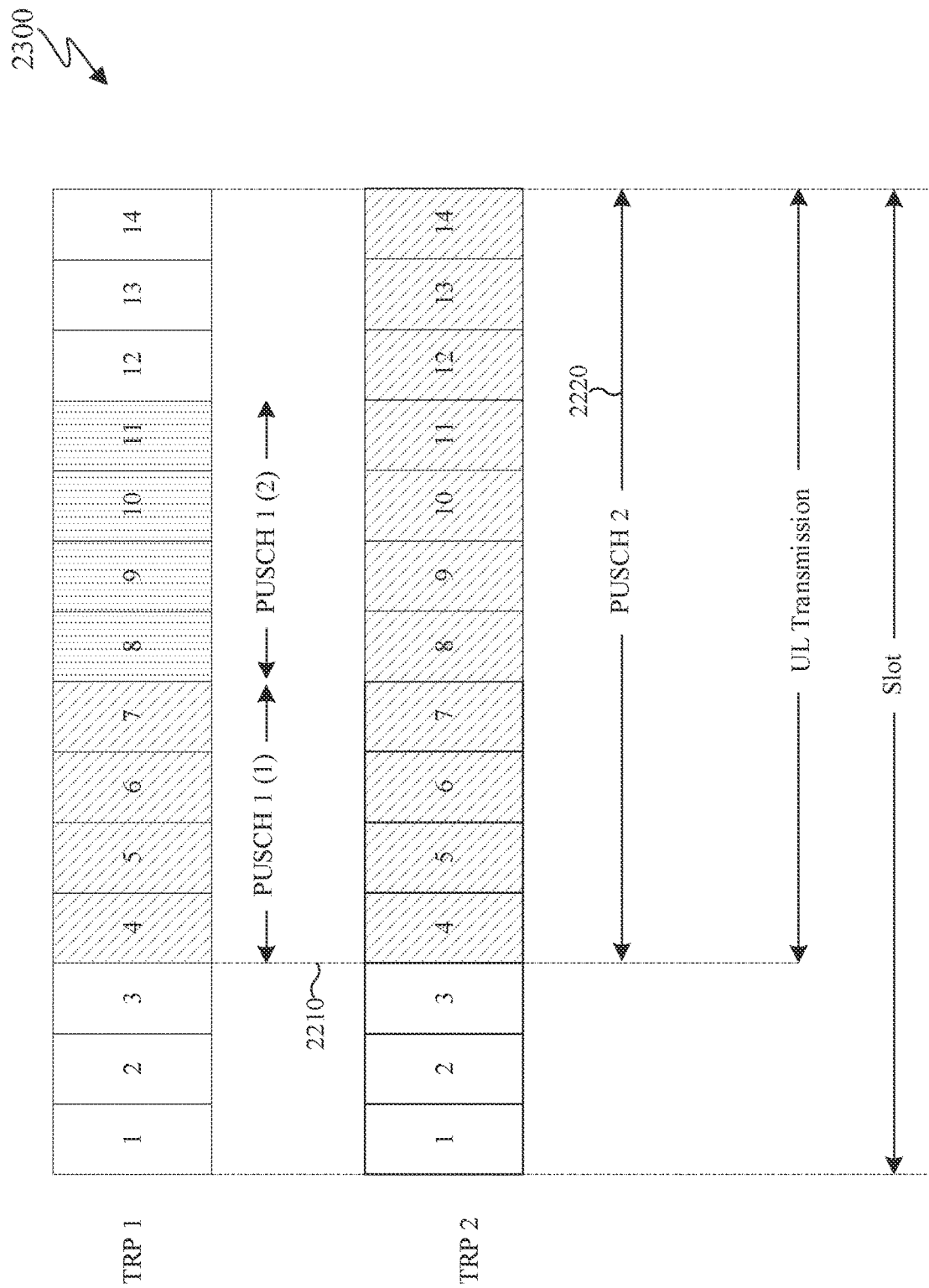

For another example, the UE can prioritize a transmission of a repetition with a smaller number of PUSCH symbols in a slot, where the UE may transmit one or more repetitions (for example, as illustrated in FIG. 23, when the UE transmits a repetition of a first PUSCH over a total of eight symbols in a slot on cell 1 and transmits a repetition of a second PUSCH over 11 symbols on cell 2 over the same slot, the UE prioritizes the repetition of the first PUSCH transmission over the slot).

FIG. 23 illustrates signal diagram 2300 where a UE is configured for PUSCH transmission with repetitions on cell 1 (PUSCH1) and on cell 2 (PUSCH2), over symbols 4 to 14 of a slot. The UE transmits two PUSCH repetitions, each of length 4 symbols, on cell 1 2310 and one repetition of length 11 symbols on cell 2 2320.

For another example, the UE can prioritize a transmission of a repetition for a transmission with a smaller number of repetitions (for example, when a UE is configured to transmit a first PUSCH with 4 repetitions on cell 1 and to transmit a second PUSCH with 8 repetitions on cell 2, the UE prioritizes transmission of the repetitions for the first PUSCH).

For another example, the UE can prioritize a transmission of a repetition having a smaller repetition number/index over a slot (for example, when a UE transmits a second repetition of a first PUSCH transmission on cell 1 over a slot and the first symbol of the second repetition of the first PUSCH is in the slot, and the UE transmits a third repetition of a second PUSCH transmission on cell 2 over the slot and the first symbol of the third repetition is in the slot, the UE prioritizes transmission of the second repetition).

Figure 24:
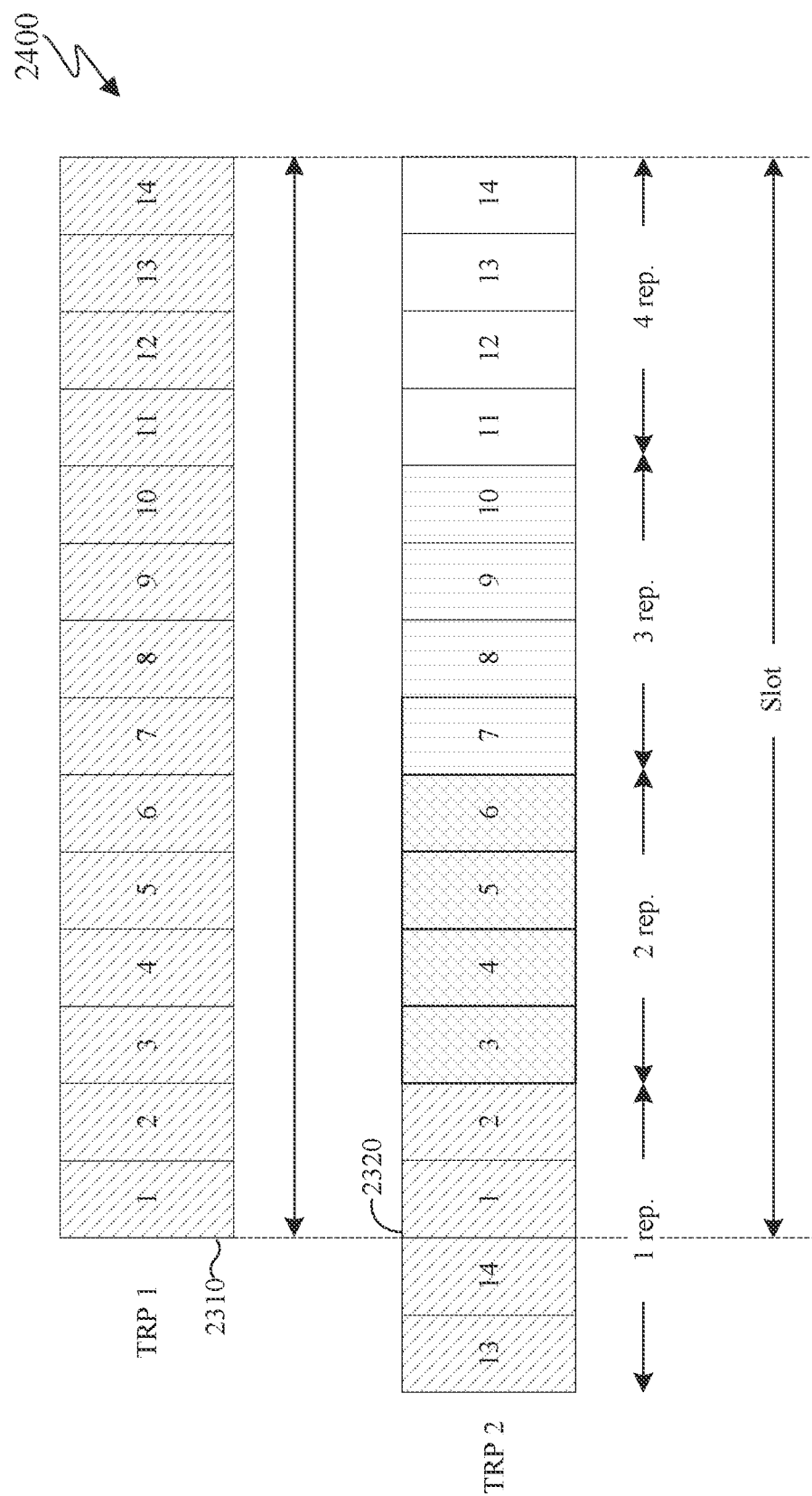

For yet another example, the UE can prioritize a transmission of a repetition for a first PUSCH transmission wherein a first symbol of the repetition starts after a first symbol of a repetition for a second PUSCH transmission (for example, as illustrated in FIG. 24, when the first symbol of a repetition for a first PUSCH transmission on cell 1 overlaps with a third symbol of a first repetition of a second PUSCH transmission on cell 2, the UE prioritizes transmission of the repetition for the first PUSCH transmission).

FIG. 24 illustrates signal diagram 2400 where a UE transmits a first PUSCH (PUSCH1) over 14 symbols on cell 1 and a second PUSCH (PUSCH2) over 4 symbols using 4 repetitions on cell 2. A first symbol of PUSCH1 2410 overlaps with a third symbol of a first repetition of PUSCH2 2420.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
receive configuration information including information related to uplink power control; and
receive a downlink control information (DCI) format;
a processor operably coupled to the transceiver, the processor configured to:
identify, based on the information and the DCI format, a first set of uplink power control parameters and a second set of the uplink power control parameters, wherein:

the first set is mapped to a first spatial setting and the second set is mapped to a second spatial setting,
the first set includes a first nominal transmission power related parameter for the first spatial setting, a first downlink pathloss estimate for the first spatial setting, a first weight factor to compensate the first downlink pathloss estimate for the first spatial setting, and a first power control adjustment state for the first spatial setting, and
the second set includes a second nominal transmission power related parameter for the second spatial setting, a second downlink pathloss estimate for the second spatial setting, a second weight factor to compensate the second downlink pathloss estimate for the second spatial setting, and a second power control adjustment state for the second spatial setting; and
identify, based on the first set, a first physical uplink shared channel (PUSCH) transmission power associated with the first spatial setting,
wherein the transceiver is further configured to transmit, based on the DCI format, the first PUSCH using the first PUSCH transmission power,
wherein the processor is further configured to identify, based on the second set, a second PUSCH transmission power associated with the second spatial setting, and
wherein the transceiver is further configured to transmit, based on the DCI format, the second PUSCH using the second PUSCH transmission power.

2. The UE of claim 1, wherein the first downlink pathloss estimate is identified based on a first reference signal (RS) associated with the first spatial setting, and
wherein the second downlink pathloss estimate is identified based on a second RS associated with the second spatial setting.

3. The UE of claim 1, wherein the first PUSCH is transmitted to a first transmission and reception point (TRP) and the second PUSCH is transmitted to a second TRP, and
wherein the first TRP is associated with the first spatial setting and the second TRP is associated with the second spatial setting.

4. The UE of claim 1, wherein an uplink power control parameter for a bandwidth of a PUSCH resource assignment is used for both identifying the first PUSCH transmission power and the second PUSCH transmission power.

5. The UE of claim 1, wherein the processor is further configured to:
obtain, based on the information and the DCI format, mappings between a set of values for a sounding reference signal (SRS) resource indicator (SRI) field included in the DCI format and sets of indexes for the first set and the second set; and
identify the first set and the second set based on the mappings and the SRI field.

6. The UE of claim 1, wherein the first PUSCH and the second PUSCH are included in a PUSCH repetition.

7. A base station (BS) comprising:
a transceiver configured to:
transmit configuration information including information related to uplink power control associated with a first set of uplink power control parameters and a second set of the uplink power control parameters, wherein the first set is mapped to a first spatial setting and the second set is mapped to a second spatial setting;

transmit a downlink control information (DCI) format;
receive a first physical uplink shared channel (PUSCH) associated with the DCI format; and
receive a second PUSCH associated with the DCI format;
wherein a first PUSCH transmission power for the first PUSCH is configured based on the first set and the DCI format,
wherein a second PUSCH transmission power for the second PUSCH is configured based on the second set and the DCI format,
wherein the first PUSCH transmission power is associated with the first spatial setting,
wherein the second PUSCH transmission power is associated with the second spatial setting,
wherein the first set includes a first nominal transmission power related parameter for the first spatial setting, a first downlink pathloss estimate for the first spatial setting, a first weight factor to compensate the first downlink pathloss estimate for the first spatial setting, and a first power control adjustment state for the first spatial setting, and
wherein the second set includes a second nominal transmission power related parameter for the second spatial setting, a second downlink pathloss estimate for the second spatial setting, a second weight factor to compensate the second downlink pathloss estimate for the second spatial setting, and a second power control adjustment state for the second spatial setting.

8. The BS of claim 7, wherein the first downlink pathloss estimate is configured based on a first reference signal (RS) associated with the first spatial setting, and
wherein the second downlink pathloss estimate is configured based on a second RS associated with the second spatial setting.

9. The BS of claim 8, wherein the first PUSCH is received by a first transmission and reception point (TRP) and the second PUSCH is received by a second TRP,
wherein the first TRP is associated with the first spatial setting and the second TRP is associated with the second spatial setting, and
wherein the first TRP and the second TRP are configured in the base station.

10. The BS of claim 7, wherein the first PUSCH and the second PUSCH are included in a PUSCH repetition.

11. A method performed by a user equipment (UE), the method comprising:
receiving configuration information including information related to uplink power control;
receiving a downlink control information (DCI) format;
identifying, based on the information and the DCI format, a first set of uplink power control parameters and a second set of the uplink power control parameters, wherein:
the first set is mapped to a first spatial setting and the second set is mapped to a second spatial setting,
the first set includes a first nominal transmission power related parameter for the first spatial setting, a first downlink pathloss estimate for the first spatial setting, a first weight factor to compensate the first downlink pathloss estimate for the first spatial setting, and a first power control adjustment state for the first spatial setting, and
the second set includes a second nominal transmission power related parameter for the second spatial setting, a second downlink pathloss estimate for the second spatial setting, a second weight factor to compensate the second downlink pathloss estimate for the second spatial setting, and a second power control adjustment state for the second spatial setting;
identifying, based on the first set, a first physical uplink shared channel (PUSCH) transmission power associated with the first spatial setting;
transmitting, based on the DCI format, the first PUSCH using the first PUSCH transmission power;
identifying, based on the second set, a second PUSCH transmission power associated with the second spatial setting; and
transmitting, based on the DCI format, the second PUSCH using the second PUSCH transmission power.

12. The method of claim 11, wherein the first downlink pathloss estimate is identified based on a first reference signal (RS) associated with the first spatial setting, and
wherein the second downlink pathloss estimate is identified based on a second RS associated with the second spatial setting.

13. The method of claim 11, wherein the first PUSCH is transmitted to a first transmission and reception point (TRP) and the second PUSCH is transmitted to a second TRP, and
wherein the first TRP is associated with the first spatial setting and the second TRP is associated with the second spatial setting.

14. The method of claim 11, wherein an uplink power control parameter for a bandwidth of a PUSCH resource assignment is used for both identifying the first PUSCH transmission power and the second PUSCH transmission power.

15. The method of claim 11, wherein identifying the first set and the second set comprises:
obtaining, based on the information and the DCI format, mappings between a set of values for a sounding reference signal (SRS) resource indicator (SRI) field included in the DCI format and sets of indexes for the first set and the second set; and
identifying the first set and the second set based on the mappings and the SRI field.

16. The method of claim 11, wherein the first PUSCH and the second PUSCH are included in a PUSCH repetition.

* * * * *